US011731287B2

(12) United States Patent
Arvayo et al.

(10) Patent No.: US 11,731,287 B2
(45) Date of Patent: Aug. 22, 2023

(54) ROBOTIC TRAY GRIPPER

(71) Applicant: Dexterity, Inc., Redwood City, CA (US)

(72) Inventors: Alberto Leyva Arvayo, Palo Alto, CA (US); Cyril Nader, East Palo Alto, CA (US); Varun Uday Nayak, Palo Alto, CA (US); Andrew Lovett, Burlingame, CA (US); Shitij Kumar, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 17/712,915

(22) Filed: Apr. 4, 2022

(65) Prior Publication Data
US 2022/0331990 A1 Oct. 20, 2022

Related U.S. Application Data

(60) Provisional application No. 63/175,784, filed on Apr. 16, 2021.

(51) Int. Cl.
*B25J 15/00* (2006.01)

(52) U.S. Cl.
CPC .................. *B25J 15/0028* (2013.01)

(58) Field of Classification Search
CPC ...... B25J 15/0028; B25J 13/08; B25J 13/081; B25J 13/086; B66C 1/663; B66C 1/666; B66C 1/427
USPC ........................................................ 294/104
See application file for complete search history.

(56) References Cited

U.S. PATENT DOCUMENTS

| 3,975,045 | A | | 8/1976 | Abarotin | |
|---|---|---|---|---|---|
| 4,611,377 | A | * | 9/1986 | McCormick | B23Q 3/15553 29/407.05 |
| 4,830,565 | A | * | 5/1989 | Bucher | B25J 15/103 414/730 |
| 4,918,991 | A | * | 4/1990 | Bucher | B25J 17/0208 976/DIG. 231 |
| 5,984,623 | A | | 11/1999 | Smith | |
| 8,308,211 | B2 | | 11/2012 | Chevassu | |

(Continued)

FOREIGN PATENT DOCUMENTS

| DE | 29519349 U1 * | 4/1996 |
|---|---|---|
| WO | 2020138344 | 7/2020 |
| WO | WO-2022038913 A1 * | 2/2022 |

*Primary Examiner* — Saul Rodriguez
*Assistant Examiner* — Brendan P Tighe
(74) *Attorney, Agent, or Firm* — Van Pelt, Yi & James LLP

(57) ABSTRACT

A robotic end effector is disclosed. The end effector is configured to grasp, move, and place one or more objects without assistance from another robot. The end effector includes a lateral member configured to be coupled to a robotic arm, a passive side member coupled substantially rigidly to the lateral member at a first distal end and configured to engage mechanically with a first recess on a first side of an object to be grasped, and an active side member coupled to the lateral member at a second distal end opposite the first distal end and configured to engage mechanically with a second recess on a second side of the object to be grasped, the second side being opposite the first side of the object to be grasped. The passive side member and the active side member each include a structure, and the structure on the passive side member and the active side member have different profiles.

19 Claims, 22 Drawing Sheets

(56) References Cited

U.S. PATENT DOCUMENTS

| | | | |
|---|---|---|---|
| 11,305,949 B1 | 4/2022 | Menassa | |
| 2001/0027634 A1* | 10/2001 | Hebron | G07F 17/0042 |
| | | | 53/501 |
| 2002/0117380 A1 | 8/2002 | Downs | |
| 2003/0120387 A1* | 6/2003 | Sherwin | B65G 61/00 |
| | | | 294/2 |
| 2013/0090761 A1* | 4/2013 | Sejimo | H02P 27/08 |
| | | | 318/434 |
| 2013/0341942 A1* | 12/2013 | Tichell Fortea | B66C 1/422 |
| | | | 294/104 |
| 2015/0063973 A1 | 3/2015 | Girtman | |
| 2016/0167228 A1 | 6/2016 | Wellman | |
| 2016/0184992 A1 | 6/2016 | Naderer | |
| 2018/0319601 A1 | 11/2018 | Brazeau | |
| 2019/0321971 A1 | 10/2019 | Bosworth | |
| 2019/0322451 A1 | 10/2019 | Bastian, II | |
| 2020/0070361 A1 | 3/2020 | Menon | |
| 2020/0269429 A1 | 8/2020 | Chavez | |
| 2020/0286192 A1 | 9/2020 | Roy | |
| 2020/0338755 A1 | 10/2020 | Behringer | |
| 2021/0354917 A1 | 11/2021 | Chirol | |
| 2022/0134579 A1* | 5/2022 | Cao | B25J 15/12 |
| | | | 294/86.4 |

* cited by examiner

700

750

ROBOTIC TRAY GRIPPER

CROSS REFERENCE TO OTHER APPLICATIONS

This application claims priority to U.S. Provisional Patent Application No. 63/175,784 entitled ROBOTIC TRAY GRIPPER filed Apr. 16, 2021 which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
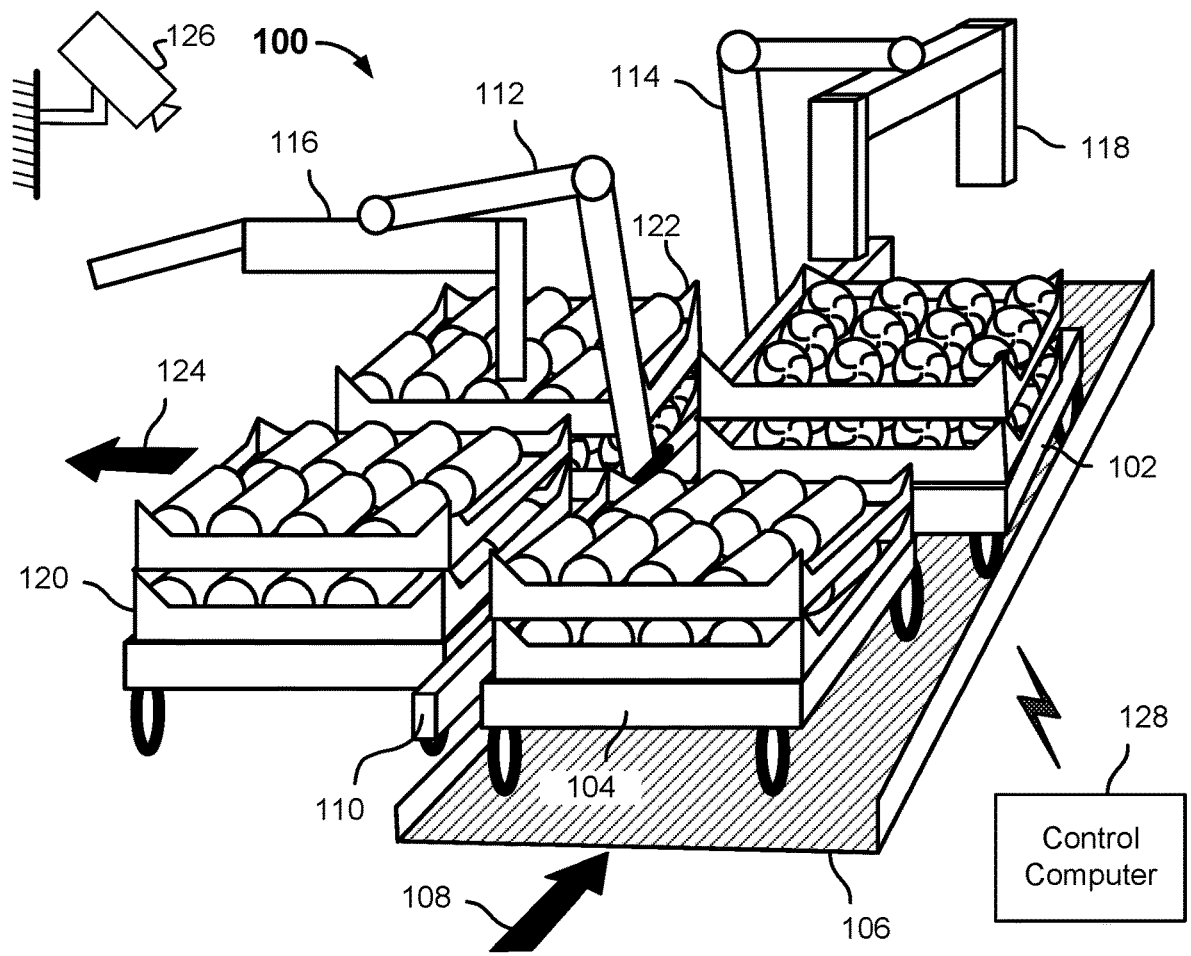
FIG. 1A is a block diagram illustrating an embodiment of a robotic line kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous, tray handling, line kitting robot is disclosed. In various embodiments, a line kitting robot as disclosed herein includes a robotic arm having an end effector as disclosed herein comprising structures to grasp a tray of items. In various embodiments, one or more such robots may operate together in a single workspace to grasp trays from source stacks and move them, singly or in groups, to destinations stacks assembled according to invoice, manifest, or other input data indicating the output stacks required to be assembled. In some embodiments, two or more robots as disclosed herein may operate on the same rail or other transport structure. Operation is coordinated to avoid collisions and to make efficient use of all robots to complete an overall set of line kitting tasks, such as to assemble a plurality of output stacks each having a corresponding mix of trays according to input information, such as invoices, manifests, etc.

Various embodiments include an end effector device (also referred to herein as an end effector) to be comprised in, or connected to, a robotic arm to grasp, move, and place one or more trays. The end effector comprises (i) a lateral member configured to be attached to a free moving end of a robotic arm, (ii) a passive side member coupled to the lateral member at a first distal end and configured to engage mechanically with a first structure on a first side of a tray, (iii) an active side member coupled to the lateral member at a second distal end opposite the first distal end and configured to engage mechanically with a second structure on a second side of the tray opposite the first side of the tray, and (iv) an active side actuation device comprising a stationary element coupled to the lateral member and an active element coupled to the active side member at or near an upper end of the active side member in a manner such that actuation of the active side actuation device moves the active element causing the active side member to rotate about a rotation axis into a position in which the active side member is substantially parallel to the lateral side member. In some embodiments, the passive side member comprises a passive-side structure that is configured to engage a hole, a recess, or a handle comprised in the first structure, and the active side member comprises an active-side structure that is configured to engage a hole, a recess, or a handle comprised in the second structure. In some embodiments, a first profile of the passive-side structure is different from a second profile of the active-side structure.

Various embodiments comprise a tray handling robotic system. The tray handling robotic system comprises (i) a memory configured to store data indicating a set of output stacks to be assembled, each output stack including an associated set of trays, and (ii) a processor coupled to the memory and configured to control operation of one or more robots, each configured to grasp, move, and place one or more trays at a time, according to a plan, to iteratively pick trays from source stacks of trays and assemble the set of output stacks, including by building each output stack by successively placing on the output stack trays picked from one or more corresponding source stacks. Each of the robots comprises a robotic arm and a tray handling end effector configured to grasp, move, and place one or more trays without assistance from another robot. The end effector comprises (i) a lateral member configured to be attached to a free moving end of a robotic arm, (ii) a passive side member coupled to the lateral member at a first distal end and configured to engage mechanically with a first structure on a first side of a tray, (iii) an active side member coupled to the lateral member at a second distal end opposite the first distal end and configured to engage mechanically with a second structure on a second side of the tray opposite the first side of the tray, and (iv) an active side actuation device comprising a stationary element coupled to the lateral member and an active element coupled to the active side member at or near an upper end of the active side member in a manner such that actuation of the active side actuation device moves the active element causing the active side member to rotate about a rotation axis into a position in which the active side member is substantially parallel to the lateral side member. In some embodiments, the passive side member comprises a passive-side structure that is configured to engage a hole, a recess, or a handle comprised in the first structure, and the active side member comprises an active-side structure that is configured to engage a hole, a recess, or a handle comprised in the second structure. In some embodiments, a first profile of the passive-side structure is different from a second profile of the active-side structure.

Various embodiments include a robotic end effector. The robotic end effector includes a lateral member configured to be coupled to a robotic arm, a passive side member coupled substantially rigidly to the lateral member at a first distal end and configured to engage mechanically with a first recess on a first side of an object to be grasped, and an active side member coupled to the lateral member at a second distal end opposite the first distal end and configured to engage mechanically with a second recess on a second side of the object to be grasped, the second side being opposite the first side of the object to be grasped. The passive side member comprises a passive-side structure that is configured to be inserted into the first recess. The active side member comprises an active-side structure that is configured to be inserted into the second recess. A first profile of the passive-side structure is different from a second profile of the active-side structure.

In various embodiments, a tray handling robotic system as disclosed herein includes a single rail system occupied by multiple robots coordinating the fulfilment of trays containing packaged food goods, or any other commercial goods or other items. The trays may arrive in stacks of various heights and stacked in various orientations. In some embodiments, the system is divided into two sides: an input side where homogenous stacks come in and an output side that is dedicated to various customers and/or other destinations and is formed by kitting various products from the input side based on an order list, for example.

In some embodiments, multiple robots operate on the same rail or other transport system. For example, two or more robots may operate on the same rail system. Each robot is mounted on a chassis that can be moved along the rail under robotic control, independently of each other robot. The robots are aware of each other and coordinate their motions to optimize order fulfillment. Each robot may use of a single tray gripper designed to grasp trays. Alternatively, a robot may use a tray gripper that is designed to grasp a plurality of trays at one time. In various embodiments, the gripper is modular and can be adapted to a variety of different trays.

Various embodiments improve control of an end effector in connection with grasping, moving, and placing one or more trays. The end effector includes a set of sensors used to improve detection of a position of at least part of the end effector and/or detection with respect to grasping a tray. For example, one or more sensors comprised in a passive side member (also referred to herein as a passive arm) and/or one or more sensors comprised in an active side member (also referred to herein as an active arm) are used in connection with detecting whether a tray is grasped by the end effector, or otherwise determine a position of the end effector (or at least part of the passive arm or at least part of the active arm) relative to a tray.

FIG. 1A is a block diagram illustrating an embodiment of a robotic line kitting system. In the example shown, system 100 includes source tray stacks 102 and 104 moving along an input stack conveyance (e.g., conveyance 106) fed in this example from an input end 108 (staging and loading area). Each of the source tray stacks 102 and 104 in this example is shown to be stacked on a wheeled cart or chassis. In various embodiments, the source tray stacks 102 and 104 may be pushed manually onto the conveyance 106, which may be a conveyor belt or other structure configured to advance the source tray stacks 102 and 104 through the workspace defined by conveyance 106. In some embodiments, the chassis or other base structure on which the source trays are stacked may be self-propelled. In some embodiments, source tray stacks 102 and 104 may be advanced through/by conveyance 106 under robotic control. For example, the speed and times at which the source tray stacks 102 and 104 are advanced by/through conveyance 106 may be controlled to facilitate efficient grasping of trays from the source tray stacks 102 and 104.

In the example shown, a single rail (e.g., rail 110) is disposed along one long side of the conveyance 106. In this example, two robots, one comprising robotic arm 112 and another comprising robotic arm 114, are mounted movably, independent of one another, on rail 110. For example, each robotic arm 112, 114 may be mounted on a self-propelled chassis that rides along rail 110. In this example, each robotic arm 112, 114 terminates with a tray handling end effector (e.g., end effector 116, 118). In some embodiments, end effector 116 and/or 118 implements end effector 300 of FIGS. 3A-3D, end effector 300 of FIGS. 5A-5C, end effector 600 of FIGS. 6A-6E, end effector 800 of FIGS. 8A-8D, and/or end effector 1204 of FIG. 12.

In various embodiments, the tray handling end effector (e.g., end effector 116 or 118) is operated under robotic control to grasp one or more trays from a source tray stack 102, 104. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member).

In various embodiments, each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. In various embodiments, a robotic control system (e.g., a computer that controls robotic arm 112, 114, such as control computer 128) controls the end effector to actuate the opening/closing of the end effector such as in connection with grasping or releasing a tray. The robotic control system controls the end effector based at least in part on image data of the work space and/or one or more sensors comprised in (or connected to) the corresponding end effector. In some embodiments, the one or more sensors one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or the a comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the a side of a tray, and/or (v) obtain information indicative of whether the grasping mechanism is closed or otherwise engaged with the tray.

In various embodiments, each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

In various embodiments, the respective robotic arms 112, 114 are operated at the same time, fully autonomously, to pick trays from source tray stacks 102, 104 and place them on destination tray stacks, such as destination tray stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one of more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors (e.g., end effectors 116, 118). In various embodiments, the robotic elements are controlled by control computer 128 based on input data, such invoice, order, and/or manifest information, as well as input state information, such inventory data indicating which source tray stacks include which type and/or quantity of product.

In various embodiments, source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/ and weight distribution. The system 100 uses force and moment control to operate robotic arms 112, 114 to insert a thumb or other protrusion gently and securely into a tray and plans its motion and tray trajectory in order to not collide with itself or the environment. In various embodiments, each robotic arm 112, 114 operates in a very tight space of roughly 2.5 m in width and has a very light footprint. The robot utilizes its full workspace and intelligently plans its motion optimizing its grasp. It recognizes the need to perform orientation changes and handles that accordingly while avoiding obstacles. The robot moves to the correct output (e.g., destination tray stack 120, 122) corresponding to the right customer while coordinating with the other robots on the rail 110. It then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

Although a single camera (e.g., camera 126) mounted to a wall in the workspace of system 100 is shown in FIG. 1A, in various embodiments, multiple cameras or other sensors, or a combination thereof, may be mounted statically in a workspace. In addition, or instead, one or more cameras or other sensors may be mounted on or near each robotic arm 112, 114, such as on the arm itself and/or on the end effector 116, 118, and/or on a structure that travels with the robotic arm 112, 114 as it is moved along rail 110.

Figure 1B:
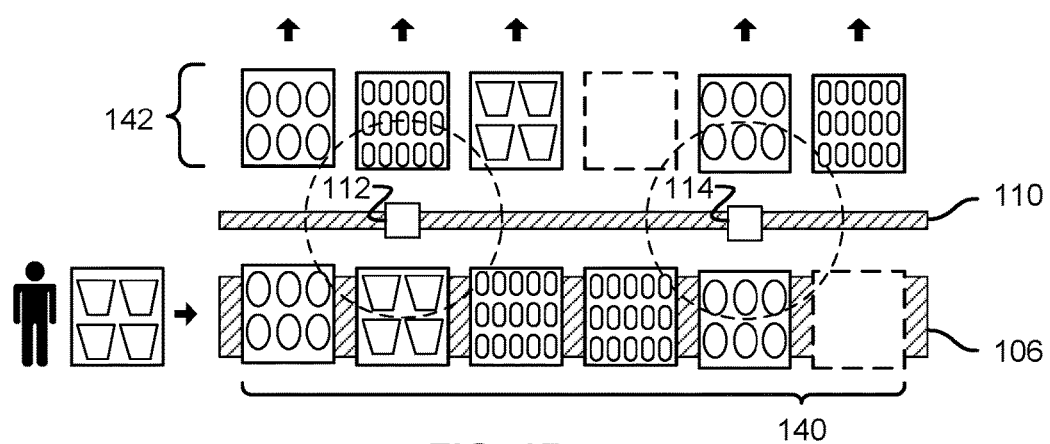
FIG. 1B is a block diagram illustrating an embodiment of a robotic line kitting system.

FIG. 1B is a block diagram illustrating an embodiment of a robotic line kitting system. In FIG. 1B, an example is shown of an overhead view of a workspace in which the system 100 of FIG. 1A may operate. In the example shown, robotic arms 112, 114 move along a common rail (e.g., rail 110), as in FIG. 1A, to access and pick trays from source stacks 140 moving along conveyance 106 and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of time, in other embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 2A:
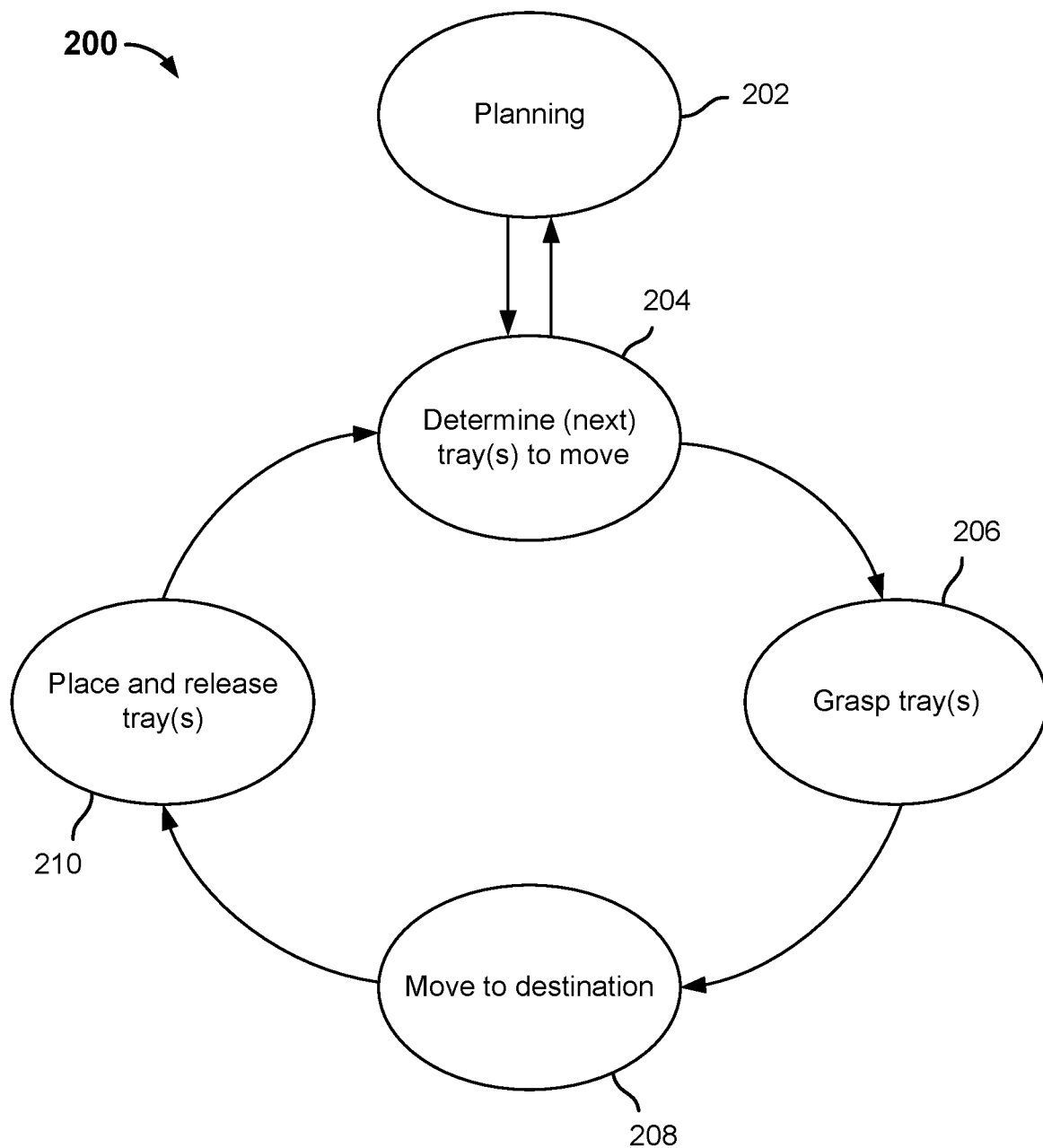
FIG. 2A is a state diagram illustrating an embodiment of an automated process to assemble stacks of trays.

FIG. 2A is a state diagram illustrating an embodiment of an automated process to assemble stacks of trays. In various embodiments, processing according to the state diagram 200 is performed by a control computer, such as control computer 128 of FIG. 1A. In the example shown, a planning state, process, and/or module 202 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 202 receives feedback indicating which destination tray stacks have been completed, which stacks of source trays have been moved into the workspace, and/or other state and context information which can be used to continuous update the plan to pick and place (stack) trays to assemble the destination stacks. In state 204, a process controlling a given robotic instrumentality (e.g., robotic arms 112 and/or 114 and associated end effectors 116 and 118, in the example shown in FIG. 1A) determines a next set of one or more trays to be move from a source stack to a destination stack according to a current overall plan as received from planning state, process, and/or module 202. For example, the robot may determine to grasp one, two, or more trays from a source stack to add them to (or start a new) destination stack. The robot enters state 206, in which a strategy and plan may be determined to do one or more of move into position to grasp the tray(s), grasp the trays, and/or begin to move them toward the destination stack location is formed; and the robot moves into position and grasps the trays. Once the tray(s) has/have been grasped, the robot enters state 208 in which the tray is moved along a planned (and, if needed, dynamically adapted) trajectory to the vicinity of the destination stack, e.g., a position hovering over the destination stack and/or a location or structure on which the destination stack is to be built. In state 210, the robot place(s) the tray(s) on the destination stack. In some embodiments, the state 210 includes maneuvers under force control to verify the tray(s) is/are place securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 204, in which a next set of one or more trays is determined to be picked from a corresponding source stack and moved to a corresponding destination stack, e.g., according to overall plan information received from planning state, process, and/or module 202. In various embodiments, a robotic system as disclosed herein continues to cycle through the states 204, 206, 208, and 210 of FIG. 2A until all destination stacks have been assembled.

Figure 2B:
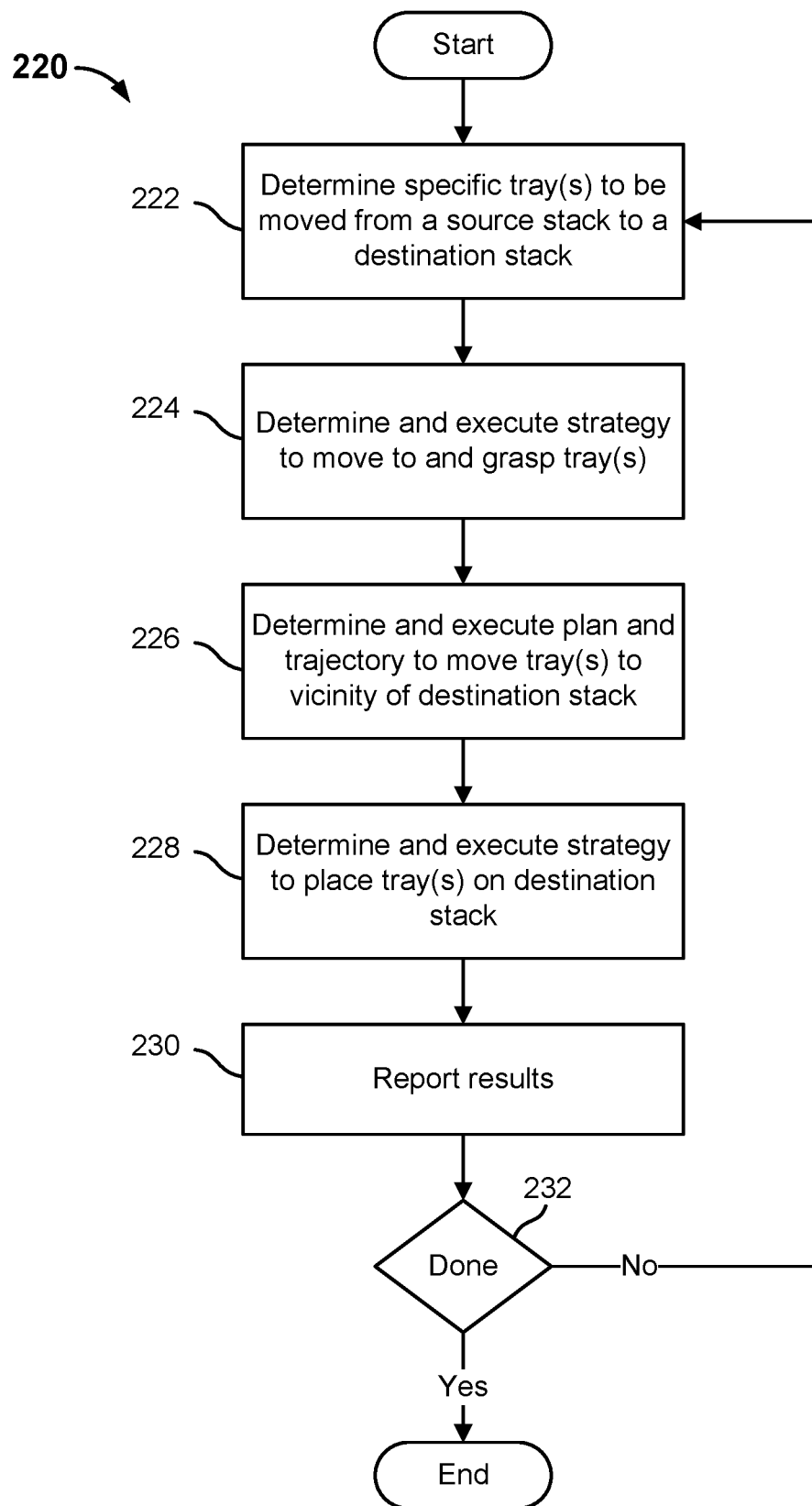
FIG. 2B is a flow diagram illustrating an embodiment of an automated process to assemble stacks of trays.

FIG. 2B is a flow diagram illustrating an embodiment of an automated process to assemble stacks of trays. In various embodiments, a process or module controlling one or more tray handling robots implements the process 220 of FIG. 2B. In various embodiments, the process 220 of FIG. 2B is performed by process or module running on a control computer, such as control computer 128 of FIG. 1A. In the example shown, at 222 a specific set of one or more trays is determined to be moved from a source stack to a destination stack. In some embodiments, a robotic arm has an end effector that accommodates picking and placing only one tray at a time. In other embodiments, a robot has an end effector that can grasp a stack of two or more trays, e.g., by grasping a bottommost one of the trays in the stack to be grasped. At 224, a strategy to move to and grasp the tray(s) is determined. For example, the robot may plan and implement a set of maneuvers to move its end effector to a position above or otherwise near the tray(s) to be grasped. A strategy to grasp the tray(s) is determined and implemented. At 226, a plan (e.g., trajectory) to move the tray(s) to a destination stack is determined and executed. The trajectory/plan takes into consideration obstacles in the workspace, such as other stacks, and potential conflicts with other robotic instrumentalities, such as another pick/place robot operating in the same workspace (e.g., robotic arms 112, 114 of FIG. 1A). At 228, a strategy to place the tray(s) atop the corresponding destination stack is determined and executed. At 230, results of the pick/place operation are reported, e.g., to a planning process or module. Subsequent iterations of steps 222, 224, 226, 228, and 230 are repeated until it is determined at 232 that processing is done, e.g., all destination stacks have been completed.

Figure 3A:
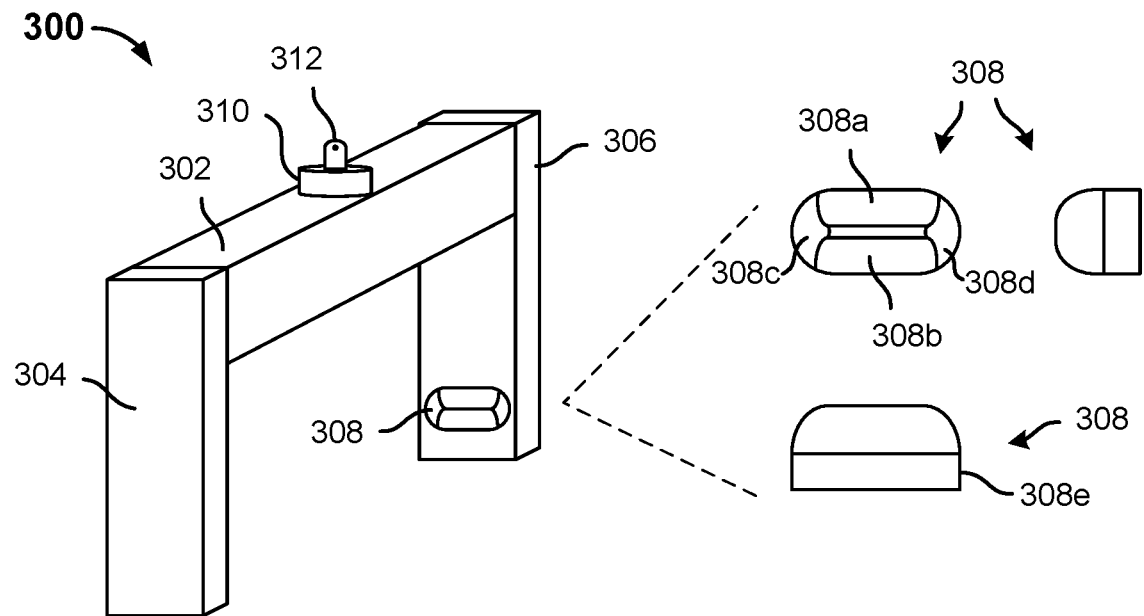
FIG. 3A is a diagram illustrating an embodiment of a robotically controlled tray handling end effector.

FIG. 3A is a diagram illustrating an embodiment of a robotically controlled tray handling end effector. In the example shown, end effector 300 includes a lateral member 302 to which a passive side member 304 is fixedly mounted and an active side member 306 is hinge or otherwise movably mounted in a manner that enables active side member 306 to be moved to an open position that facilitates moving the end effector 300 into a position to grasp a tray. An active side thumb 308 is positioned on (or comprises an integral part or feature of) an inner face of active side member 306.

According to various embodiments, active side member 306 is movable within a predefined range of motion. As an example, end effector 300 includes one or more stopping mechanisms (e.g., stopper, switch, or the like, or a combination thereof) that restrict movement of the active side member 306 to within the predefined range of motion. End effector 300 may include an open-position stopping mechanism that prevents active side member 306 from moving in an opening direction past an open position threshold (e.g., 130 degrees relative to a plane/vector along which lateral member 302 extends in a lengthwise direction, or between 30 and 50 degrees relative to a closed position at which active member 306 is substantially normal to the plane/vector along which lateral member 302 extends). End effector 300 may include a closed-position stopping mechanism that prevents active side member 306 from moving in an closing direction past a closed position threshold (e.g., about 90 degrees relative to a plane/vector along which lateral member 302 extends in a lengthwise direction, etc.). Various values can be selected for the open position threshold and/or the closed position threshold. In some embodiments, the open position threshold is set based at least in part on an environment in which the robot to which end effector 300 is connected operates. As an example, if a plurality of robots are operating within a relatively close proximity, the range of motion of the active side member 306 is based at least in part on a distance between robots or between zones in which the various robots (e.g., neighboring robots) operate. As the active side member 306 moves from a closed position to an open position the further the active side member 306 extends in the x-direction. In addition, the further the active side member 306 is movable from the closed position to the open position, the greater the time required for the robotic system to control to open/close active side member 306 in connection with grasping/placing a tray(s). Accordingly, limiting the range of motion of the active side member 306 (e.g., to a sufficient open position threshold to permit the end effector to grasp a set of one or more tray(s) with ease) allows the robotic system to operate more efficiently within proximity of other robots (e.g., other robots that are autonomously grasping, moving, and placing trays).

In some embodiments, the open position threshold and/or the closed position threshold are configurable. For example, the one or more stopping mechanisms are configurable and set based on the desired the open position threshold and/or the closed position threshold configuration(s).

The active side thumb 308 and a corresponding structure on the inner face of passive side member 304, not visible in FIG. 3A, are of a size and shape suitable to be inserted into a handhold or other recess or hole on opposite sides of a tray to be grasped by the end effector 300. In various embodiments, the thumbs 308 are removable and replaceable, e.g., to be replaced once they are worn out from use or to be exchanged with a thumb having a different shape, dimensions, materials, etc. suitable to grasp a different type of tray, for example. Active side thumb 308 is fixedly mounted to active side member 306 such as to impede thumb 308 from rotating (e.g., during engagement with tray handle, etc.). For example, active side thumb is mounted to active side member 306 at three mounting points. Various other mounting configurations or number of mounting points may be implemented. As shown in the three-view drawing to the right of FIG. 3A, in the example shown the thumb 308 has convex surfaces 308a-d on each of four sides. In various embodiments, the convex surfaces 308a-d facilitate using force and moment control to insert the thumb 308 into a handle or other hole or recess in the side of a tray to be grasped. In some embodiments, the convex surfaces are used in conjunction with active force control and orientation impedance control to ensure a gentle and secure final grasp, where the active side is fully into the tray. For example, even if imperfectly aligned, a convex surface 308a-d engaged in a side or edge of a hole may enable the rest of the thumb 308 to more readily be slid more fully into the hole. Flat surfaces 308e at the base of the thumb, nearest the inner side wall of the side member 304, 306 on which the thumb 308 is mounted, in various embodiments enable misalignment to between the end effector 300 and the tray(s) being grasped to be corrected and/or alignment refined. For example, in a picking episode, a thumb of the passive side member 304 may be moved into position near a handle or other hole on one side of the tray to be grasped. The convex surfaces 308a-d may be used, under force control, to slide the thumb partway into the hole. The flat surfaces 308e near the base of the thumb may be used to better align the passive side with the tray prior to closing the active side member 306.

Referring further to FIG. 3A, in the example shown end effector 300 includes a force sensor 310 mounted on lateral member 302 and a bracket 312 to attach the end effector 300 to a robotic arm. In some embodiments, end effector 300 may be attached to a robotic arm via a pin inserted through a hole in bracket 312, enabling the end effector 300 to swing freely and/or be rotated under robotic control, e.g., using one or more motors, about a longitudinal axis of the pin. In various embodiments, force sensor 310 detects forces/moments experienced by end effector 300 in an x, y, and/or z direction. Force sensor 310 may have a single axis overload of force in the x or y direction (e.g., $F_{xy}$) of at least ±10000 N and/or a single axis overload of force in the z direction of at least ±30000 N (e.g., $F_z$). Force sensor 310 may have a single axis overload of torque in the x or y direction (e.g., $T_{xy}$) of at least ±1000 Nm and/or a single axis overload of torque in the z direction of up to at least ±1000 Nm (e.g., $T_z$). In some embodiments, force sensor 310 has a single axis overload of force in the x or y direction (e.g., $F_{xy}$) of about ±18000 N and/or a single axis overload of force in the z direction of about ±48000 N (e.g., $F_z$); and a single axis overload of torque in the x or y direction (e.g., $T_{xy}$) of about ±1700 Nm and/or a single axis overload of torque in the z direction of about ±1900 Nm (e.g., $T_z$).

In various embodiments, passive side member 304 is fixedly mounted to lateral member 302. The fixed mounting of the passive side member 304 may enable forces and moments acting on end effector 300 (e.g., on passive side member 304) to propagate through the frame of the end effector (e.g., lateral member 302 and passive side member 304) to force sensor 310. For example, the fixed mounting of the passive side member 304 avoids forces and movements from translating into a movement of other parts of the end effector such as active member 306 when active member 306 is being actuated to move thumb 308 to engage with a tray handle (e.g., to insert thumb 308 into the tray handle).

Figure 3B:
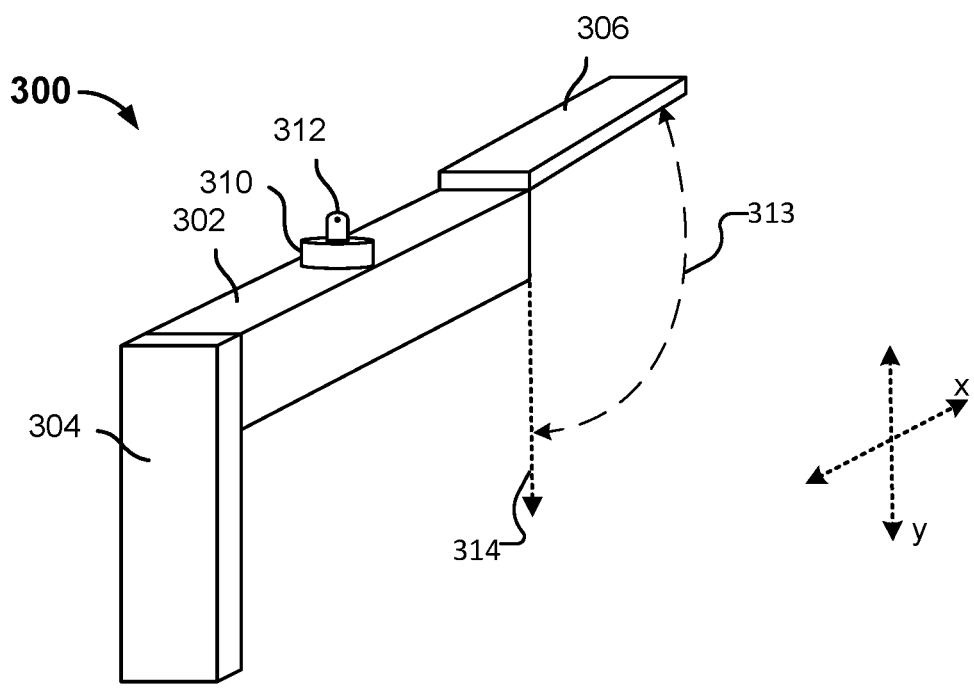
FIG. 3B is a diagram illustrating an embodiment of a robotically controlled tray handling end effector.

FIG. 3B is a diagram illustrating an embodiment of a robotically controlled tray handling end effector. In the state shown in FIG. 3B, the active side member 306 has been opened to the open position, e.g., by a pneumatic or hydraulic piston, motor, or other motive force and structure housed in lateral member 302 (not shown) in FIG. 3B.

Vector/direction 314 illustrates an example of a closed position (e.g., the closed position threshold). In various embodiments, the closed position is a configuration according to which active side member 306 forms a normal vector relative to lateral member 302. For example, the closed position threshold is 90 degrees (or substantially 90 degrees) relative to a direction along which lateral member 302 extends. As illustrated in FIG. 3B, active side member 306 is moved to an open position. As active side member 306 is moved to the open position, an angle between active side member 306 and vector/direction 314 is represented as angle 313. According to various embodiments, the open position threshold corresponds to a configuration at which angle 313 is between 35 degrees and 50 degrees. In some embodiments, open position threshold corresponds to a configuration at which angle 313 is between 40 degrees and 50 degrees. In some embodiments, open position threshold corresponds to a configuration at which angle 313 is between about 40 degrees and about 45 degrees.

In various embodiments, robotic system controls active side member 306 (e.g., controls an actuation device to move active side member 306) based at least in part on information obtained by one or more sensors, such as a sensor(s) comprised in active side member 306 (e.g., thumb 308 of active side member 306), a sensor(s) comprised in passive side member 304 (e.g., a thumb of passive side member), a camera or other sensor comprised on or around the robot to which end effector 300 is connected (e.g., to capture information pertaining to the workspace of the robot), and the like, or any combination thereof. Active side member 306 is controlled according to a plan to grasp, move, and/or place a set of one or more trays and the information obtained from the one or more sensors. Active side member 306 may be further controlled according to obstacles within the workspace of the robot such as another stack of trays (e.g., an adjacent stack), another robot working to remove a tray another stack of trays (or of the same tray).

In various embodiments, tray pick operations as disclosed herein are smooth, gentle, and precise and are tolerant to uncertainty and disturbances. In various embodiments, a pick episode includes one or more of:

Lowering to a target pose (adjacent tray) from the hover pose (above stack) coupled with height checks to refine estimation of where the tray handle is and a dynamic goal adjustment.

Using the active side surface of the end effector to control any uncertainties in the direction of the rail be it a misplaced tray or a human error. In various embodiments, after moving to the hover pose, the robot lowers into the position to align with the handle, and while it does this lowering motion, force control is used to ensure that the alignment in the rail direction is perfect (or substantially perfect). This can be very likely because the gripper almost perfectly fits the length of the tray in between itself, and any misalignment can lead to contact. This contact is ensured to be on the active side panel, which has a diagonal plane—meaning that the robotic system can effectively use the contact between the gripper and the [misaligned] trays to adjust our position using force control.

Proceeding to use a three degree of freedom (3 DOF) force controller (e.g., based on sensor readings from force sensor 310) to find the position of the (tray handle) slot on the passive side and insert the passive side thumb into the slot using the convexity of the thumb (e.g., one or more of surfaces 308 a-d, depending on which engage with the tray). In some embodiments, a 6DOF controller is used to perform XYZ force control to ensure that the thumb is inserted and XYZ axis moment to ensure that the plane of the passive side panel is flush against the plane of the tray outer surface. In some embodiments, one or more sensors in passive side member 304 (or in the thumb of passive side member 304) are used to obtain information associated with a location of the tray, such as information indicating a position of the second side member relative to the first tray, information indicative of when the first tray is in a position at which the end effector is controlled to engage the passive-side structure with the hole (e.g., to detect when the tray is in proximity of the tray such as at an entry of the gripper such as for detection that end effector 300 is properly positioned to begin a process of engaging the tray with passive side member 304, etc.), the recess, or the handle comprised in the first structure, information indicative of when the first tray is in a position at which the passive-side structure is engaged with the hole, the recess, or the handle comprised in the first structure, and the like, or any combination thereof.

Using the flat extremities (e.g., 308e) of the thumbs to adjust for any orientation mismatch.

When all is good (e.g., in response to a determination that the passive side member 304 and/or active side member is positioned properly to grasp the tray, etc.), close the active side (e.g., 306) with force/moment control, to account for any residual orientation or positional uncertainty in the tray pose, and lift the tray up to make sanity checks for the quality of the grasp (e.g., weight as expected, forces and moments balanced and otherwise consistent with good grasp). In some embodiments, when the state of the gripper is deemed good, the active side is closed with force/moment control enabled in order to refine and correct for any residual orientation/position errors, which ensure gentle handling of the tray.

The robot safely aborts the pick if it detects any anomalies related to weight or quality of the trays in the stack or the quality of the stacking itself.

Figure 3C:
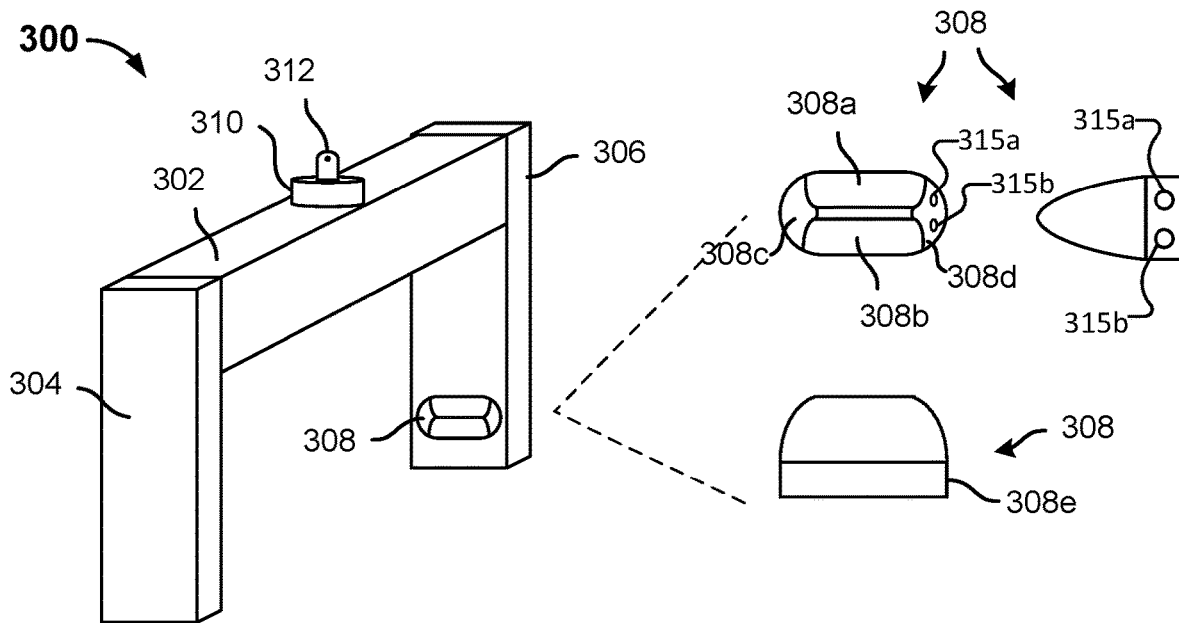
FIG. 3C is a diagram illustrating an embodiment of a robotically controlled tray handling end effector.
Figure 3D:
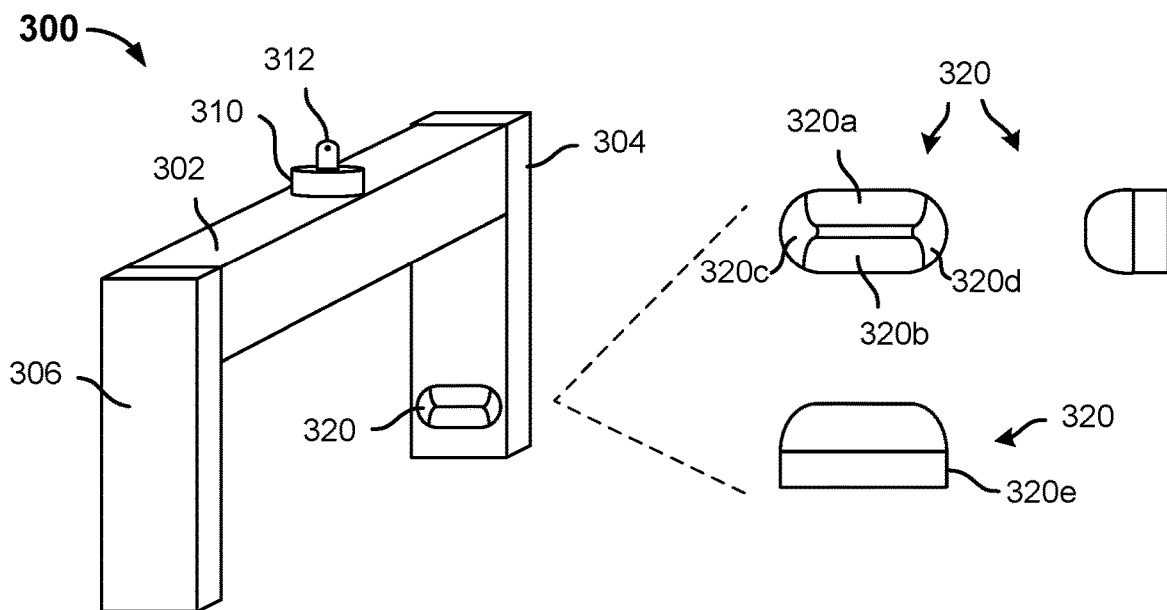
FIG. 3D is a diagram illustrating an embodiment of a robotically controlled tray handling end effector.

FIG. 3C is a diagram illustrating an embodiment of a robotically controlled tray handling end effector. FIG. 3D is a diagram illustrating an embodiment of a robotically controlled tray handling end effector. In the examples illustrated in FIGS. 3C and 3D, end effector 300 comprises a thumb 308 on active side member and thumb 320 on passive side member 304. Thumb 308 and/or thumb 320 is a structure that is comprised on, or attached to, the corresponding side member. Thumb 308 and/or thumb 320 is respectively used to engage a side of a tray, such as a hole, a recess, or a handle comprised in the first structure.

In various embodiments, thumb 308 of active side member 306 and thumb 320 of passive side member 304 comprise different profiles. For example, thumb 308 and thumb 320 have different sizes or shapes. Different profiles are implemented for thumbs 308 and 320 based on their respective uses/purposes in connection with grasping or releasing a tray. The robotic system controls end effector 300 to engage a tray (e.g., a hole, a recess, or a handle on a side of the tray) first, and thereafter controls to actuate active side member 306 to position thumb 308 to engage the tray (e.g., a hole, a recess, or a handle on an opposing side of the tray). As an example, because thumb 320 is positioned to engage tray before engaging tray with active side member 306, the robotic system has less degrees of freedom (or less ability to move) active side member 306 or thumb 308 to engage the tray (e.g., in the hole, the recess, or the handle on an opposing side of the tray). Accordingly, thumb 308 has a profile that is conducive to insertion of thumb 308 to engage a structure of the tray (e.g., the hole, recess, or handle, etc.). According to various embodiments, the profile of thumb 308 on active side member 306 is steeper than the profile of thumb 320 on passive side member 304. In some embodiments, a height of thumb 308 is between 25% and 50% larger than a height of thumb 320. In some embodiments, a height of thumb 308 is between 30% and 40% larger than a height of thumb 320. The width of thumbs 308 and 320 may be the same (or otherwise selected based on the structure of a side of the tray with which the thumbs engage, such as a shape of a handle on a side of a tray, etc.).

Figure 3E:
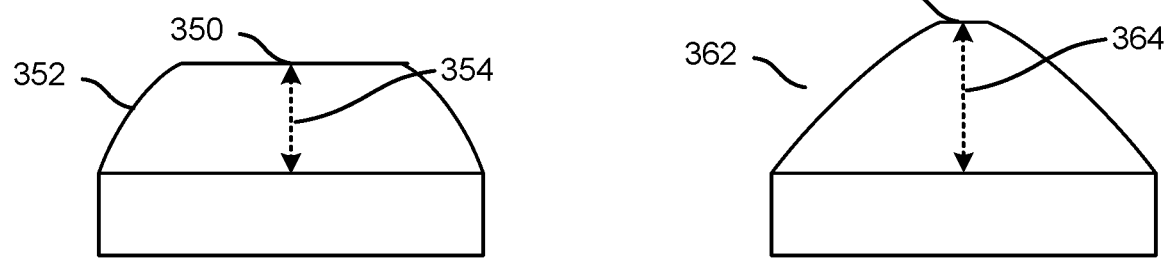
FIG. 3E is a diagram illustrating an embodiment of a robotically controlled tray handling end effector.

FIG. 3E is a diagram illustrating an embodiment of a robotically controlled tray handling end effector. As illustrated in FIG. 3E, a profile of a thumb 350 of for a passive side member is contrasted with a profile of a thumb 360 for an active side member. Height 364 of thumb 360 is larger than height 354 of thumb 350. In some embodiments, a ratio of height 364 to height 354 is about 1.3:1. In some embodiments, a ratio of height 364 to height 354 is about 1.38:1. The ratio of height 364 to height 354 may be between 1.25:1 and 1.5:1. In some embodiments, height 354 of thumb 350 is about 1 inch, and height 364 of thumb 360 is about 1.378 inches. The difference between heights 364 and 354 allows for thumb 360 to have a steeper cone shape than thumb 350. As an example, widths and/or lengths of thumbs 350 and 360 are the same). The steeper profile 362 (e.g., steeper cone shape) of thumb 360 (e.g., compared to profile 352 of thumb 35) causes less surface area with which to engage the tray (e.g., the structure on a side of the tray). The lesser surface area may have a relatively reduced friction thereby facilitating easier insertion of thumb 360 to the structure of the tray as the active side member closes (e.g., is moved to the corresponding closed position). In addition, the steeper profile 362 of thumb 360 may permit easier insertion of thumb 360 as active side member is moved into position to engage the tray (e.g., the tip of thumb 308 takes up less surface area and thus can more easily fit into the structure of the tray, such as a handle, even if active side member is mis-aligned with tray). Conversely, the less steep profile of thumb 350 enables a relatively larger surface area to engage the tray thereby facilitating a better grasp of the tray by end effector (e.g., the relatively larger surface area of thumb 350 engaging the tray provides better support for the tray and a greater friction between the tray and thumb 350, which may thus prevent slippage of the tray).

Returning to FIG. 3C, thumb 308 of active side member 306 may have one or more sensors. For example, as illustrated in FIG. 3C, thumb 308 comprises sensor 315a and sensor 315b on a side of the thumb. In some embodiments, sensor 315a and/or 315b are light sensors, such as reflective sensors. For example, sensors 315a and 315b may respectively emit a light and detect whether the light is reflected back respectively to sensors 315a and 315b. In the absence of a structure in proximity to sensors 315a and 315b light may not be reflected back to sensors 315a and 315b (or less than a threshold amount of light is detected by sensors 315a and 315b). In contrast, if thumb 308 is inserted to tray or in proximity of the tray (e.g., engaging a hole, recess, or handle of the tray), sensors 315a and 315b detect the proximity of the tray. Sensors 315a and 315b may be used to determine that thumb 308 is engaged with the tray. Although FIG. 3C illustrates thumb 308 as comprising two sensors, a various number of sensors may be implemented.

In some embodiments, sensors 315a and/or 315b are configured to have a narrow focus. For example, a standard sensor may be modified with a cover that restricts a size of an opening (e.g., a surface area) from which light is emitted and/or received. The narrow focus of sensors 315a and/or 315b reduces detection of structure/objects at a distance. For example, the narrow focus of sensors 315a and/or 315b ensures that sensors 315a and/or 315b primarily (e.g., only) detect the presence of a structure (e.g., a tray) in close proximity. Decreasing a surface area of an emitter and/or receiver of a sensor has in turn decreased effective range of a reflective sensor. As an example, the angle of incident light reaching a receiver's surface is closer to normal (e.g., because light rays of larger angles or less normal are trapped in the receiver's aperture tunnel length. In some embodiments, sensors 315a and/or 315b are configured to detect the presence of an object (e.g., the tray) at a range of about 1 mm. In some embodiments, sensors 315a and/or 315b are configured to detect the presence of an object (e.g., the tray) at a range of up to 3-5 mm. In some embodiments, sensors 315a and/or 315b are configured to detect the presence of an object (e.g., the tray) at a range of up to 1 cm. In some embodiments, sensors 315a and/or 315b are configured to detect the presence of an object (e.g., the tray) at a range of up to 3 cm.

According to various embodiments, one or more sensors comprised on thumb 308 (or on active side member 306 in proximity to thumb 308) obtain information indicative of when the tray is in a position at which the thumb 308 is engaged with the hole, the recess, or the handle comprised in the first structure. The robotic system uses the information in connection with controlling the robot (e.g., robot arm) to position end effector 300 or to actuate/move active side member 306 to grasp/release a tray. For example, in connection with grasping a tray, robotic system uses the information obtained by sensor 315a and/or 315b to detect whether thumb 308 has engaged the tray (and whether the tray is grasped by end effector), and in response to determining that thumb 308 has engaged the tray the robotic system may determine to move the tray (e.g., to pick up the tray and move the tray to a destination location). The robotic system may use the information obtained by sensor 315a and/or 315b in conjunction with information obtained by force sensor 310 to determine that the tray is securely grasped before the robotic system determines to begin moving the tray.

Figure 4A:
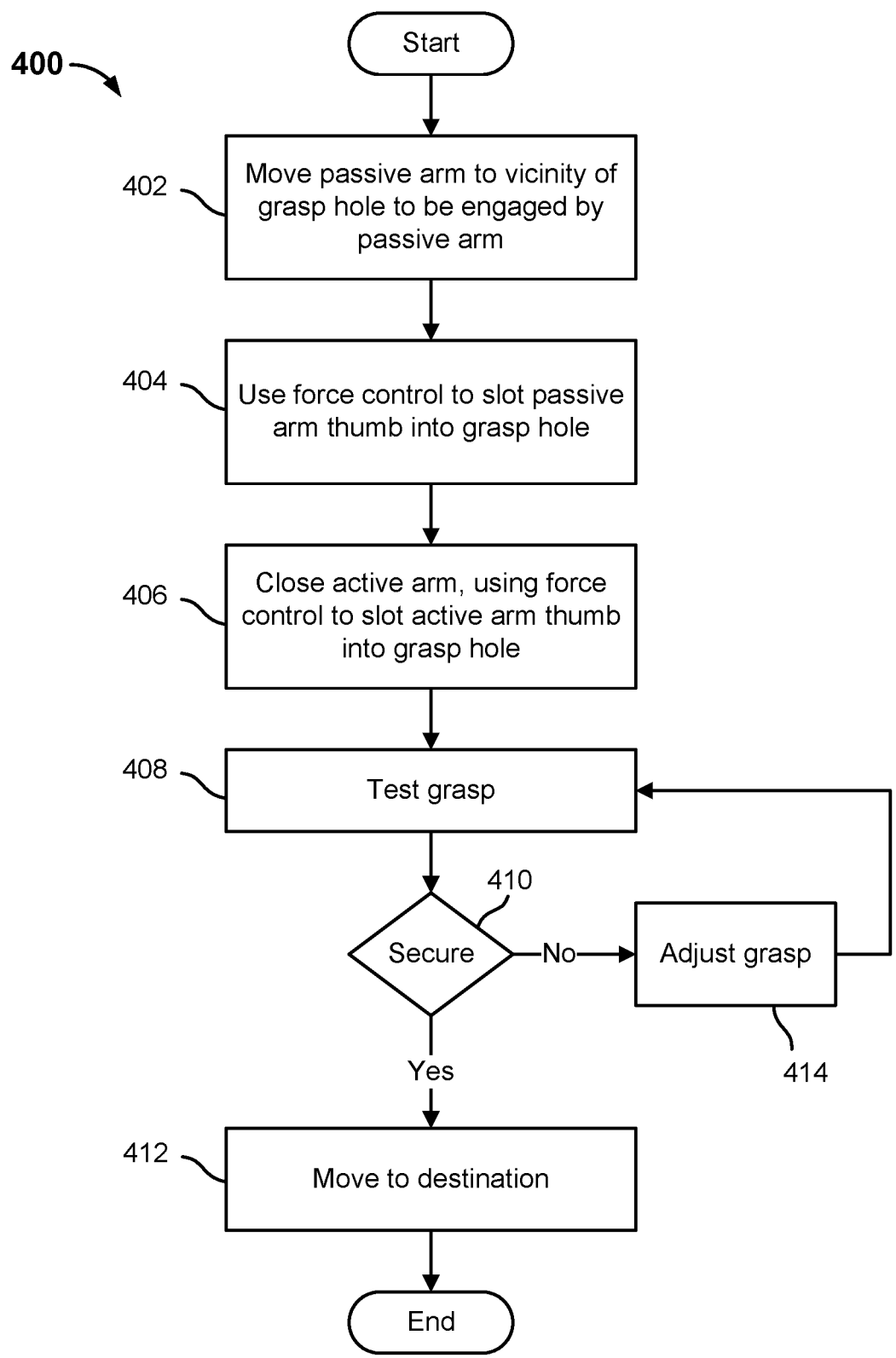
FIG. 4A is a flow diagram illustrating an embodiment of a process for grasping one or more tray using a robotically controlled tray handling end effector.

FIG. 4A is a flow diagram illustrating an embodiment of a process for grasping one or more tray using a robotically controlled tray handling end effector. In various embodiments, process 400 of FIG. 4A is performed by a control computer, such as control computer 128 of FIG. 1A, e.g., to control a single-robot tray handling robot, such as robotic arms 112, 114 of FIGS. 1A and 1B and/or a robot equipped with a tray handling end effector, such as end effector 300 of FIGS. 3A-3E. In the example shown, at 402 a passive side member ("arm") is moved to a position near a grasp hold or other hole or recess in a side of the tray to be grasped. The active side member may be placed in an open position to facilitate moving the tray handling end effector into position without having to raise the end effector to as great a height, e.g., to clear the top of the source stack. At 404, force control is used to slot the passive side thumb (or similar protrusion or structure) into the tray hole (or recess). The insertion may include phases, including initially using convex surfaces of the thumb to slide the thumb into the hole or recess and then using force control to further and/or more fully insert the thumb into the hole or recess, including by sliding flat surfaces of the thumb into the hole or recess to ensure the end effector is fully aligned with the tray. At 406, the active side member is closed and force control is used to slot the thumb (or similar structure) of the active side member into the hole or recess on the tray on the side opposite from the passive side member. At 408, the robot tests its grasp of the tray, and if the grasp is determined at 410 to be secure the robot moves the tray to its destination at 412. If the grasp is determined at 410 not to be secure, the grasp is adjusted at 414 and tested again at 408. For example, the robot may set the tray back down on the source stack, release the tray, and attempt a new grasp. Or, the robot may set the tray at least partly on the source stack and attempt to adjust its grip without fully releasing the tray, e.g., by using force control to try to slot the passive and/or active side thumbs, respectively, more fully into the tray.

In various embodiments, a single robot tray gripping robot as disclosed herein uses a vertical workspace of 0-2.7 m, which allows it to pick very tall stacks and very low stacks while avoiding obstacles and singularity. The robot can reset itself from any given position and orientation safely and without collision using a set of tools to calculate its best reset strategy. On a given pick episode the robot will first analyze the pose of its target, confirm the target and pose, and then plan the best way to safely get to the target, using a direct paradigm that uses a combination of collision avoidance and orientation interpolation coupled with a positional trajectory if the robot is physically able to clear the tray and move to a hover position above it. If the robot recognizes that it is not able to clear tall stacks due to robot workspace limitations, it will plan a series of joint motions to position itself directly into the insertion position without needing to hover over it first.

In various embodiments, after executing checks to ensure a successful and secure grasp, the robot moves to clear the top tray remaining on the source stack using a set of rail motions orientation interpolations and collision avoidance and proceeds along a planned trajectory to the vicinity of the destination stack, e.g., a "hover" position over the top of the destination stack.

Figure 4B:
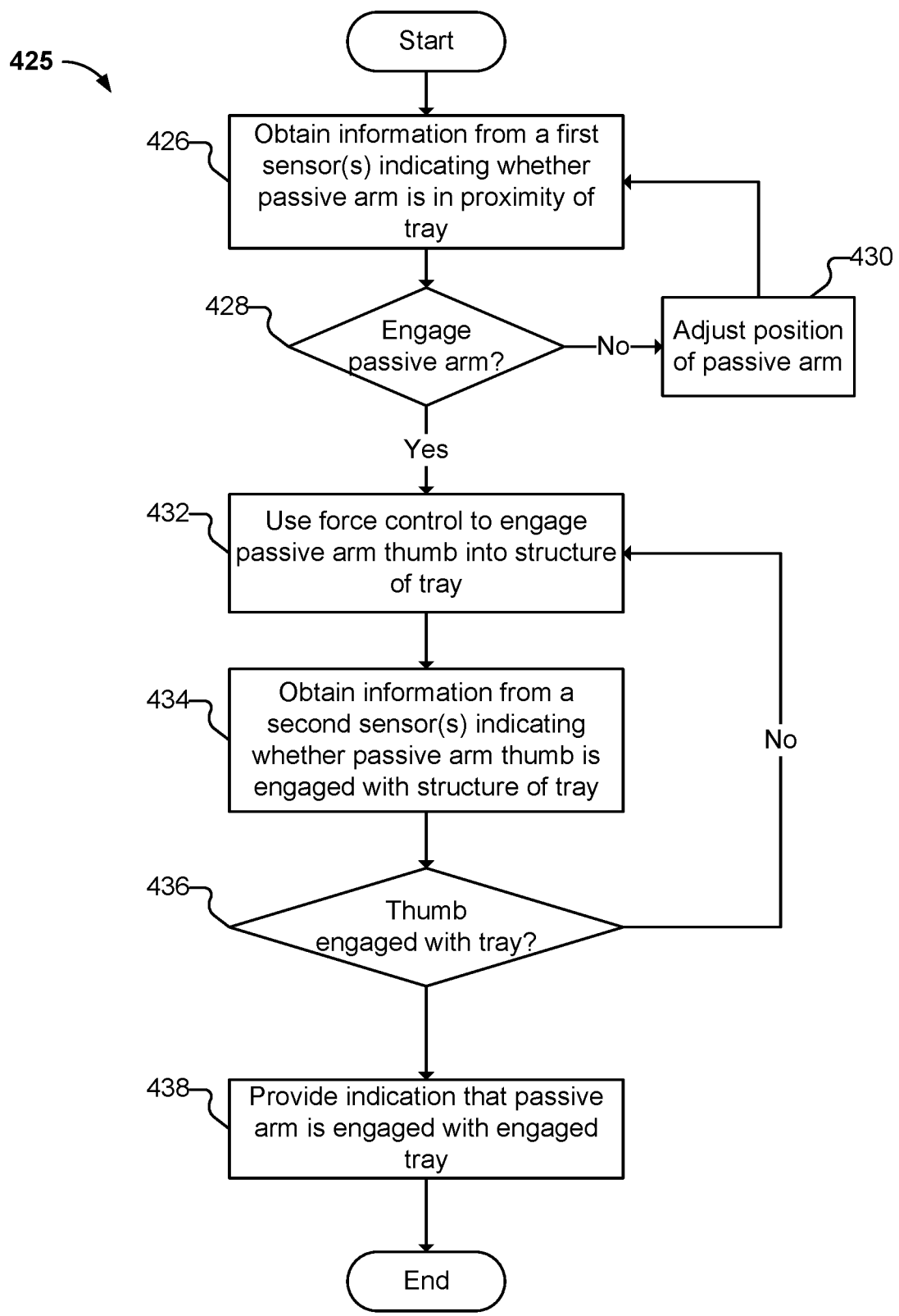
FIG. 4B is a flow diagram illustrating an embodiment of a process for grasping one or more tray using a robotically controlled tray handling end effector.

FIG. 4B is a flow diagram illustrating an embodiment of a process for grasping one or more tray using a robotically controlled tray handling end effector. Process 425 is implemented in connection with grasping an item such as a tray. For example, process 425 is implemented in connection with 404 of process 400.

According to various embodiments, passive side member (e.g., passive side member 304 of end effector 300) comprises one or more sensors. The one or more sensors comprised on the passive side member are configured to obtain information pertaining to a location of a structure (e.g., a tray) in relation to a position of the end effector (or specifically the passive side member). Examples of information obtained by the one or more sensors include (i) obtain information indicative of when the tray (or end effector relative to the tray) is in a position at which the end effector is controlled to engage at least one side of the end effector (e.g., a passive member or a structure comprised on the passive member) with a hole, a recess, or the comprised in a side of a tray (e.g., a tray being grasped), (ii) obtain information indicative of when the tray (or end effector relative to the tray) is in a position at which the end effector (e.g., a passive member or a structure comprised on the passive member), etc. The robotic system may use information obtained from the one or more sensors in connection with positioning the passive side member (or the end effector generally). In some embodiments, the robotic system uses the information obtained from the one or more sensors in conjunction with information obtained from a force sensor to control the end effector (e.g., a thumb comprised on passive side member to engage the tray).

In various embodiments, the end effector comprises a first sensor that is configured to obtain information indicative of when the tray is in a position at which the end effector is controlled to engage a passive-side structure (e.g., a thumb disposed on passive side member) with a hole, the recess, or the handle comprised in a structure of the tray. The first sensor is disposed on the passive side member, such as at or near a distal end of the passive side member (e.g., near the bottom or distal end of a fin of the passive side member). As the end effector is moved in proximity to the tray, the robotic system uses information obtained from the first sensor in connection with moving the end effector to engage the tray with the structure on passive-side structure (e.g., a thumb disposed on passive side member). For example, the robotic system uses the information obtained from the first sensor to coarsely position the end effector (e.g., to determine whether the tray is between the side members of the end effector, etc.).

In various embodiments, the end effector comprises a second sensor that is configured to obtain information indicative of when the tray is in a position at which the passive-side structure is engaged with the hole, the recess, or the handle comprised in the structure (e.g., a structure on the side of the tray) The second sensor is disposed on the passive side member, such as in proximity of a structure on the passive side member (e.g., near a thumb of the passive side member or near the top of a fin of the passive side member). As the end effector is moved in proximity to the tray, the robotic system uses information obtained from the second sensor in connection with moving the end effector to engage the tray with the structure on passive-side structure (e.g., a thumb disposed on passive side member). For example, the robotic system uses the information obtained from the second sensor to fine tune a positioning of the end effector.

At 426, information is obtained from a first sensor (s). The information indicates whether a passive arm (passive side member) of the end effector is in proximity of the tray.

At 428, the robotic system determines whether to engage the passive arm. For example, the robotic system uses the information obtained from the first sensor to determine whether to engage the tray with the passive arm. The robotic system determines to engage the tray with the passive arm in response to determining that the plan for moving trays indicates that the tray is to be picked and placed in a destination location, and that the tray is in proximity to the end effector. In some embodiments, the system uses the information obtained from the first sensor to determine whether the tray is between the passive arm and the active arm of the end effector.

In response to determining that the passive arm is not to be engaged (e.g., with the tray) at 428, process 425 proceeds to 430 at which the position of the passive arm is adjusted. The robotic system controls the robotic arm to move the end effector such as closer to the tray. Thereafter, process 425 returns to 426.

In response to determining that the passive arm is to be engaged (e.g., with the tray) at 428, process 425 proceeds to 432 at which the robotic system uses force control to engage the passive arm thumb with the tray. For example, the robotic system uses force control to engage thumb of the passive arm into a structure of the tray (e.g., a hole, recess, handle, etc.).

At 434, information is obtained from a second sensor(s). The information indicates whether the passive arm thumb is engaged with the structure of the tray.

At 436, the robotic system determines whether the thumb of the passive arm is engaged with the tray.

In response to determining that the passive arm thumb is not engaged with the tray at 436, process 425 returns to 432 and 432-436 are repeated. For example, the robotic system further controls to move the end effector to engage the structure of the tray with the passive arm thumb.

In response to determining that the passive arm thumb is engaged with the tray at 436, process 425 proceeds to 438 at which an indication that the passive arm is engaged with the tray. For example, in the case that process 425 is invoked by 404 of process 400, 428 provides an indication to the robotic system (e.g., a process running on the robotic system) that the passive thumb arm is engaged with the tray and that process 400 may proceed to 406.

Figure 4C:
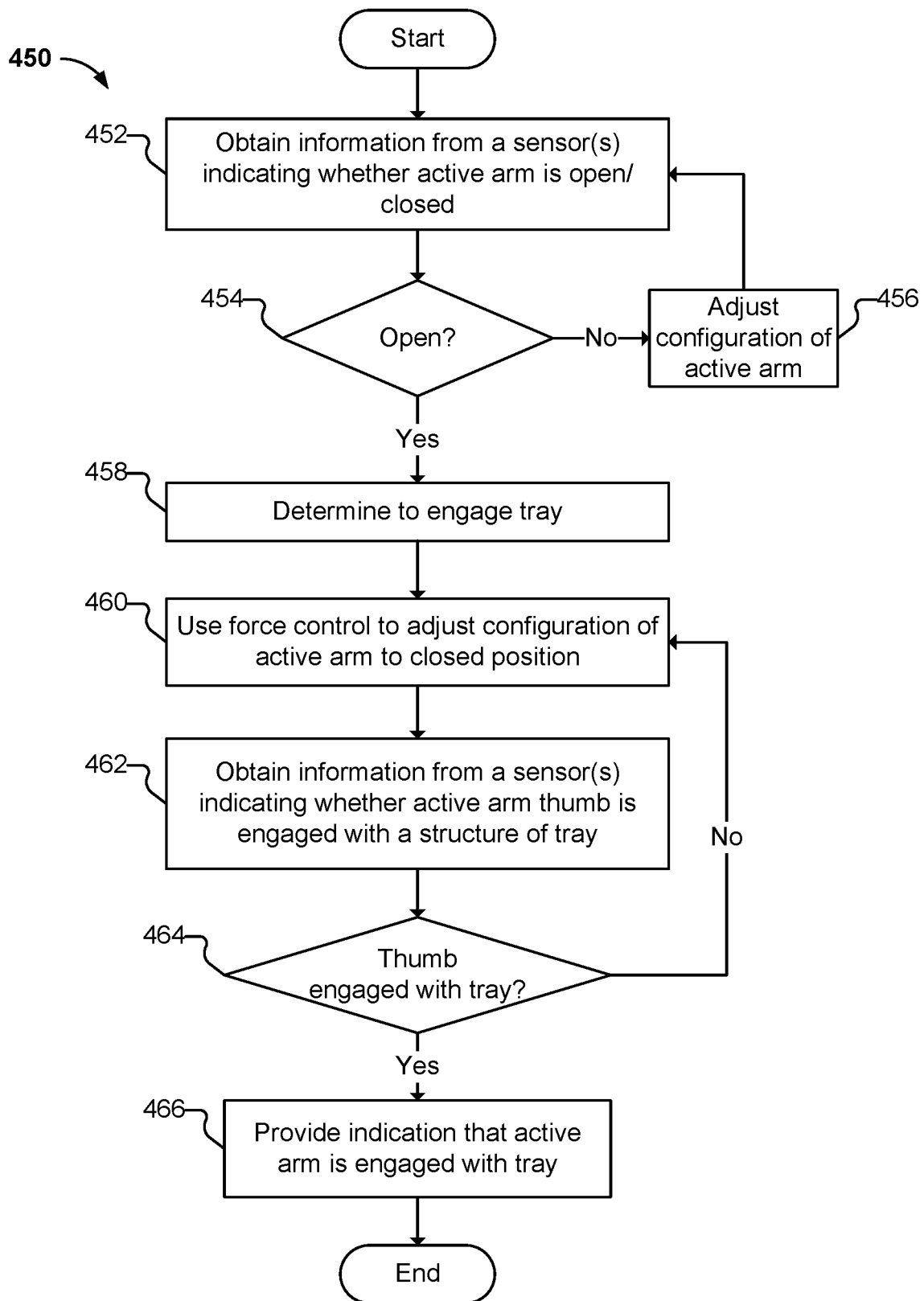
FIG. 4C is a flow diagram illustrating an embodiment of a process for grasping one or more tray using a robotically controlled tray handling end effector.

FIG. 4C is a flow diagram illustrating an embodiment of a process for grasping one or more tray using a robotically controlled tray handling end effector. Process 450 is implemented in connection with grasping an item such as a tray. For example, process 450 is implemented in connection with 406 of process 400.

According to various embodiments, end effector (e.g., the lateral member or active arm) comprises one or more sensors that obtain information pertaining to a position of the active arm (e.g., active side member 306 of end effector 306). In some embodiments, the end effector (e.g., the lateral member or active arm) comprises a sensor(s) that detects whether the active arm is in an open position or a closed position. For example, the sensor is a mechanical limit switch that is configured to obtain information indicative of whether the active side member is in an open position or a closed position. In some embodiments, the end effector (e.g., the lateral member or active arm) comprises a sensor(s) that detects an extent to which the active arm is in an open position or a closed position (e.g., the sensor determines a particular orientation of the active arm or a particular location of the active arm between the open position and the closed position, inclusive). For example, the sensor is a light sensor. The light sensor is configured to obtain information indicative of whether the active side member is in an open position or a closed position. The light sensor may be further configured to obtain information indicative of an extent to which the active side member is open (e.g., whether the active arm is partially open such as half-way between the open position and the closed position, etc.). The robotic system uses the one or more sensors (e.g., the sensor(s) that obtains information pertaining to a position of the active arm) to control actuation of an actuator that moves the active arm to move (e.g., to move the active arm between the closed position and open position).

In some embodiments, end effector (e.g., the active arm of the end effector) comprises one or more sensors that are used to detect whether the active arm (e.g., a thumb of the active arm) is engaged with a tray (e.g., a structure on the tray such as a hole, a recess, or a handle, etc.). For example, the end effector comprises sensor 315*a* and/or 315*b* of end effector 300 illustrated in FIG. 3C.

At 452, information indicating whether the active arm is open/closed is obtained from a sensor (e.g., a sensor comprised on the end effector such as at the lateral member or active member). The robotic system uses the sensor to obtain information pertaining to a position of the active arm.

At 454, the robotic system determines whether the active arm is in an open position. For example, the robotic system determines whether the active arm is fully open (e.g., opened to the open position threshold). As another example, the robotic system determines whether the active arm is sufficiently open to grasp a tray (e.g., if an adjacent stack prevents/restricts the robotic system from fully opening the active arm).

In response to determining that the active arm is not in an open position at 454, process 450 proceeds to 456 at which the position of the active arm is adjusted. For example, the position of the active arm is adjusted to permit the end effector to grasp the tray (e.g., to ensure clearance of the tray as the end effector is controlled to grasp the tray). The robotic system controls the robotic arm to move the active arm to further open the active arm, or to fully open the active arm. Thereafter, process 450 returns to 452.

In response to determining that the active arm is in an open position at 454, process 450 proceeds to 458 at which the robotic system determines to engage the tray. For example, the robotic system determines to control the actuator to move the active arm to engage the tray with the active arm (e.g., a structure on the active arm such as an active arm thumb).

At 460, force control is used to adjust the configuration of the active arm to the closed position. In response to determining to engage the tray, the robotic system controls the actuator to move the active arm to the closed position.

At 462, information is obtained from sensor(s), the information indicative of whether the active arm thumb is engaged with a structure of the tray. For example, the robotic system obtains information from sensor 315a and/or 315b of end effector 300 illustrated in FIG. 3C.

At 464, a determination of whether the active arm thumb is engaged with the tray is performed. In some embodiments, the robotic system uses the information obtained from the sensor(s) (e.g., the information indicative of whether the active arm thumb is engaged with a structure of the tray) to determine whether the active arm thumb is engaged with the tray (e.g., whether the active arm thumb is inserted into a hole, recess, or handle of the tray). In some embodiments, the robotic system further obtains information from a force sensor and uses information pertaining to forces acting on end effector in connection with determining whether the active arm thumb is engaged with the tray.

In response to determining that the active arm thumb is not engaged with the tray at 464, process 450 returns to 460 to further adjust the configuration of the active arm. Process 450 iterates through 460, 462, and 464 until the robotic system determines that the active arm thumb is engaged with the tray.

In response to determining that the active arm thumb is not engaged with the tray at 464, process 450 proceeds to 466 at which an indication that the active arm is engaged with the tray is provided. For example, in the case that process 450 is invoked by 406 of process 400, 466 provides an indication to the robotic system (e.g., a process running on the robotic system) that the active thumb arm is engaged with the tray and that process 400 may proceed to 408.

Figure 4D:
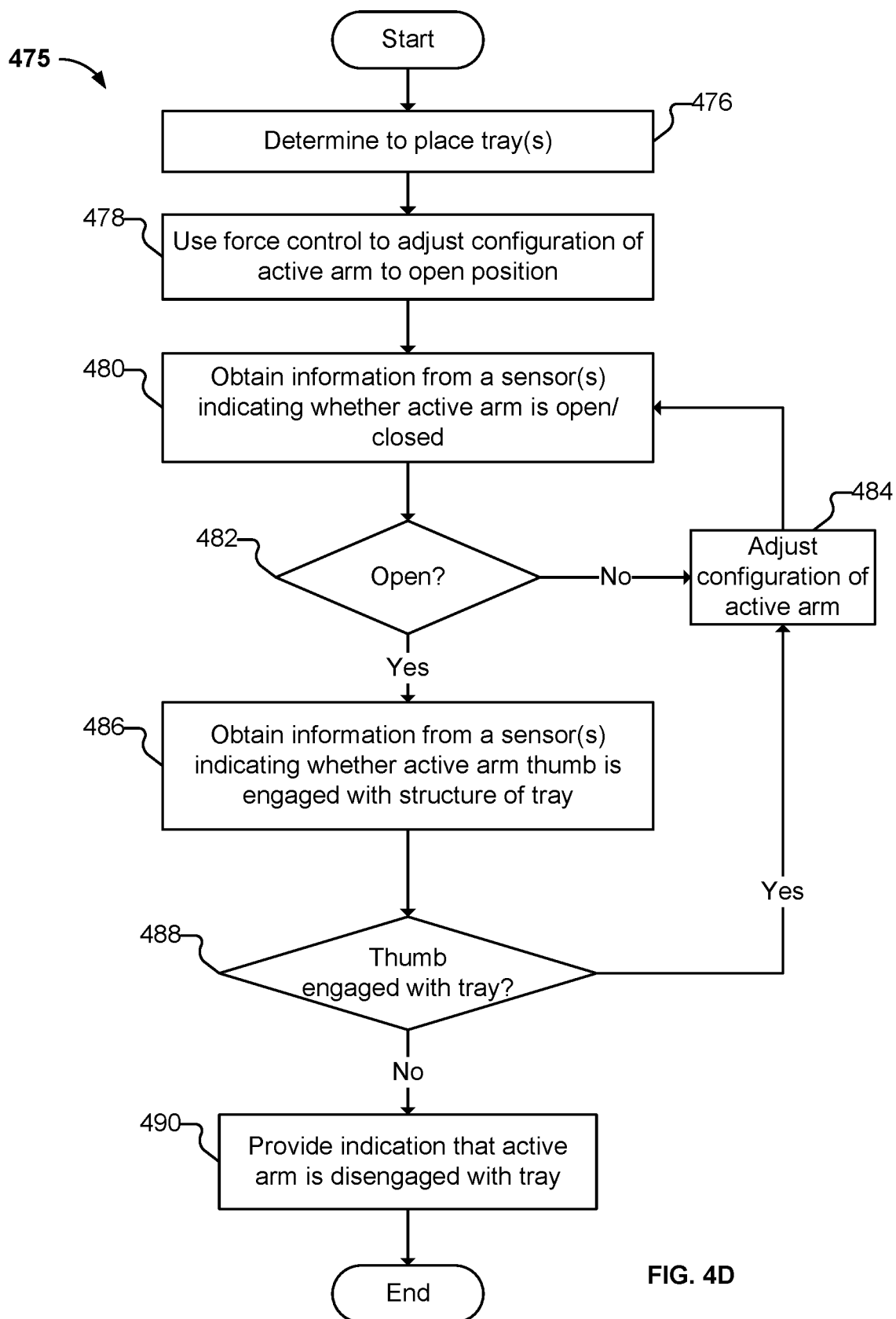
FIG. 4D is a flow diagram illustrating an embodiment of a process for releasing one or more tray using a robotically controlled tray handling end effector.

FIG. 4D is a flow diagram illustrating an embodiment of a process for releasing one or more tray using a robotically controlled tray handling end effector. Process 475 is implemented in connection with moving or releasing an item such as a tray. For example, process 475 is implemented in connection with 412 of process 400.

At 476, a determination is made to place a tray(s). In some embodiments, the robotic system determines to place a tray in a destination location in response to moving the tray to an area in proximity to the destination location at which the tray is to be placed.

At 478, force control is used to adjust configuration of the active arm to move the active arm to an open position. In some embodiments, in response to determining that the tray is to be placed (e.g., that the end effector is to release) the tray, the robotic system determines to control the active arm to move the active arm to an open position to release the tray. The robotic system can control the actuator to move the active arm to the open position threshold (e.g., to move the active arm to a fully open position) or to otherwise move the active arm to an open position sufficient to enable release of the tray.

At 480, information is obtained from a sensor(s), the information indicates whether the active arm is open or closed. The robotic system uses the sensor to obtain information pertaining to a position of the active arm.

At 482, a determination is made as to whether the active arm is in an open position. For example, the robotic uses the sensor to determine whether the active arm is in a fully open position (e.g., that the active arm is configured at the open position threshold), or alternatively, whether the active ram is sufficiently open to enable release of the tray.

In response to determining that the active arm is not in an open position at 482, process 475 proceeds to 484 at which the configuration of the active arm is adjusted. The robotic system uses force control (e.g., controls the actuator) to move further open the active arm. Process 475 thereafter proceeds to 480 at which 480 and 482 are iterated until the active arm is moved to an open position for the tray to be released.

At 486, information is obtained from sensor(s), the information indicative of whether the active arm thumb is engaged with a structure of the tray. For example, the robotic system obtains information from sensor 315a and/or 315b of end effector 300 illustrated in FIG. 3C.

At 488, a determination of whether the active arm thumb is engaged with the tray is performed. In some embodiments, the robotic system uses the information obtained from the sensor(s) (e.g., the information indicative of whether the active arm thumb is engaged with a structure of the tray) to determine whether the active arm thumb is engaged with the tray (e.g., whether the active arm thumb is inserted into a hole, recess, or handle of the tray). In some embodiments, the robotic system further obtains information from a force sensor and uses information pertaining to forces acting on end effector in connection with determining whether the active arm thumb is engaged with the tray.

The robotic system obtains the information indicative of whether the active arm thumb is engaged with a structure of the tray and determines whether the active arm thumb is engaged with the tray as a check to determine whether the tray is released or able to be released.

In response to determining that the active arm thumb is still engaged with the tray at 488, process 475 proceeds to 484 at which the robotic system adjusts the configuration of the active arm (e.g., to further open the active arm). Thereafter, process 475 iterates through 480-488 until the active arm is disengaged from the tray.

In response to determining that the active arm thumb is not engaged with the tray at 488, process 475 proceeds to 490 at which an indication that the active arm is disengaged with the tray is provided. For example, in the case that process 475 is invoked by 412 of process 400 of FIG. 4A, 490 provides an indication to the robotic system (e.g., a process running on the robotic system) that the active thumb arm is disengaged with the tray (e.g., that the tray is release and successfully moved to the destination location) and the robotic system can thereafter determine whether the stack of trays is complete or that another tray is to be moved.

Figure 5A:
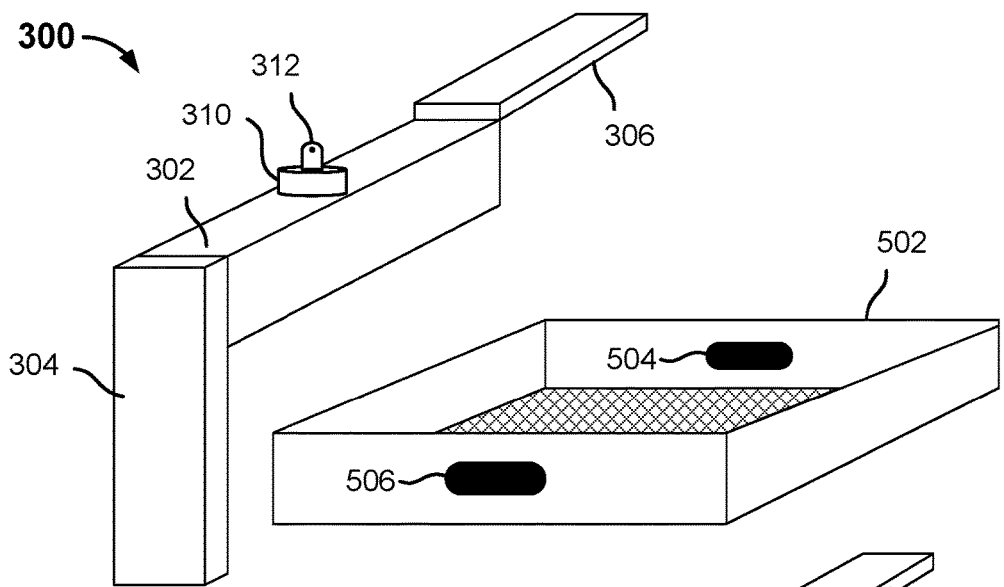
FIG. 5A is a diagram illustrating an embodiment of a robotically controlled tray handling end effector.

FIG. 5A is a diagram illustrating an embodiment of a robotically controlled tray handling end effector. In the example shown, end effector 300 of FIGS. 3A and 3B is shown in a state in which the active side member 306 is in an open position. In various embodiments, the activation of the active panel (e.g., active side member 306) is performed by a cushioned two-way pneumatic cylinder. In the position as shown in FIG. 5A, the end effector 300 is near but not yet immediately adjacent to the tray 502, which in this example has handles or holes 504 and 506 on opposite sides of the tray 502.

Figure 5B:
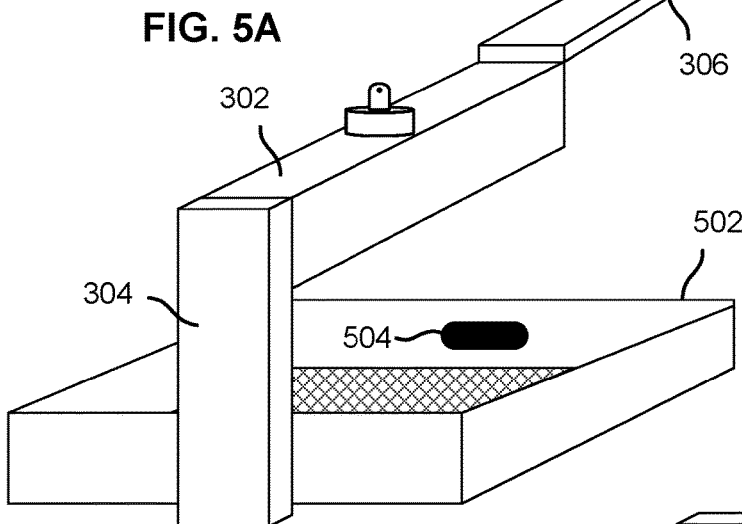
FIG. 5B is a diagram illustrating an embodiment of a robotically controlled tray handling end effector.

FIG. 5B is a diagram illustrating an embodiment of a robotically controlled tray handling end effector. In the state shown, passive side member 304 has engaged the tray 502, e.g., by slotting a thumb of passive side member 304 (not shown) into the handle or other hole 506 on the near side wall of tray 502. For example, a combination of position control to move the passive side member 304 of end effector 300 to a position near the hole 506 of tray 502 and force control to slot a thumb or other protrusion or structure of the passive side member 304 into the hole 506 may be used, in various embodiments.

Figure 5C:
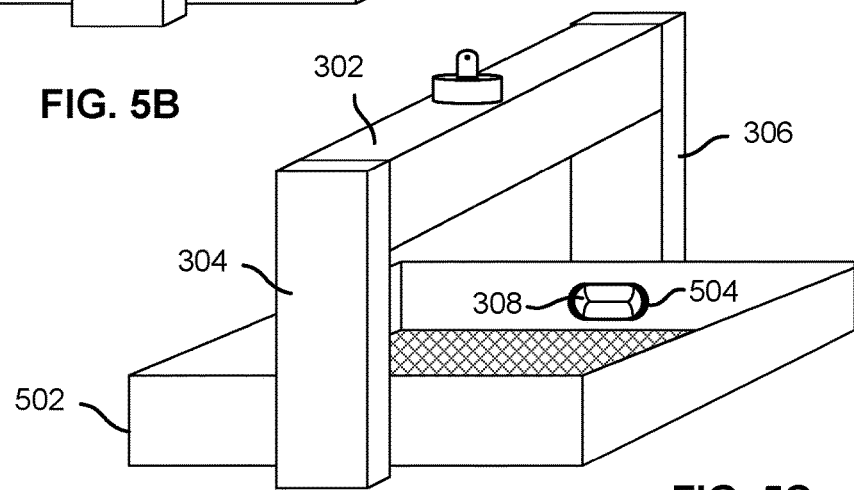
FIG. 5C is a diagram illustrating an embodiment of a robotically controlled tray handling end effector.

FIG. 5C is a diagram illustrating an embodiment of a robotically controlled tray handling end effector. In the example and state shown, the active side member 306 of end effector 300 has been closed and slotted into hole 504 of tray 502, e.g., by inserting thumb 308 of active side member 306 into the hole 504, as shown.

While a single tray is shown being grasped in FIGS. 5A through 5C, in various embodiments a single robot tray handling robot as disclosed herein may grasp two or more stacked trays, e.g., by grasping a bottommost one of them in the manner illustrated in FIGS. 5A through 5C. The robot may then lift and move the stack comprising the tray it grasped, and any trays stacked on top of the tray it grasped. In various embodiments, stability is maintained at least in part by the inner faces of the side members (e.g., 304, 306) engaging the outer faces of the trays in the stack that has been grasped.

Figure 6A:
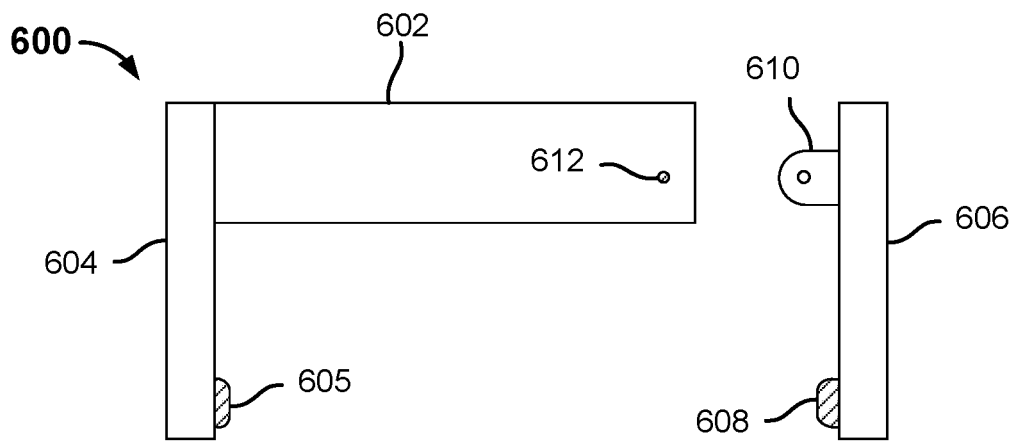
FIG. 6A is a diagram illustrating an embodiment of a robotically controlled tray handling end effector.

FIG. 6A is a diagram illustrating an embodiment of a robotically controlled tray handling end effector. In various embodiments, an end effector such as end effector 300 of FIGS. 3A and 3B may include structures as shown in FIG. 6A. In the example shown, end effector 600 includes a lateral member 602 and a passive side member 604 having a passive side thumb 605 configured to be inserted into a handle or other hole or recess on a first side of a tray. The end effector further includes an active side member 606 with an active side thumb 608. Active side member 606 includes a tab or bracket 610 mounted on the upper part of the inside face of active side member 606, which in this example is positioned to align with a hole 612 (or set of holes) through lateral member 602. In some embodiments, the passive side thumb 605 and the active side thumb 608 have different profiles. For example, the active side thumb 608 has a steeper curvature or profile than the passive side thumb 605. As another example, the active side thumb 608 has a larger height than the passive side thumb 605.

Figure 6B:
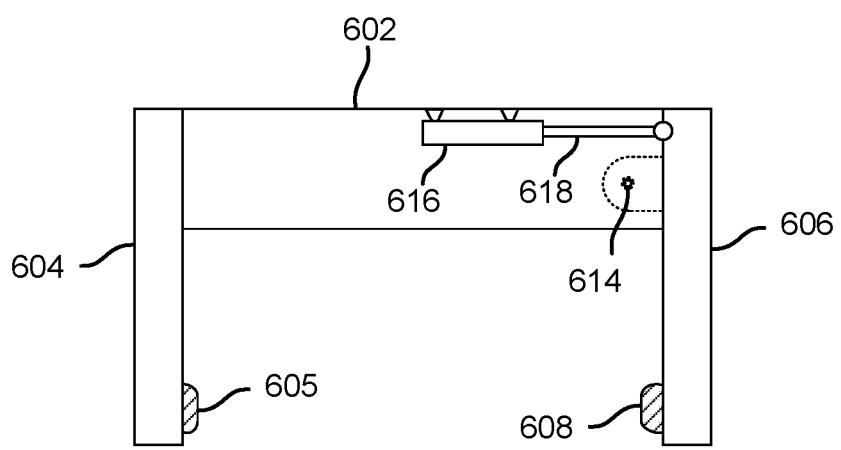
FIG. 6B is a diagram illustrating an embodiment of a robotically controlled tray handling end effector.

FIG. 6B is a diagram illustrating an embodiment of a robotically controlled tray handling end effector. In various embodiments, an end effector such as end effector 300 of FIGS. 3A and 3B may include structures as shown in FIG. 6B. In the example and state shown, end effector 600 of FIG. 6A is shown in an assembled state (and in a closed position of the active side member 606). A shoulder bolt 614 (or hinge pin, or similar structure) is shown to be inserted through hole(s) 612 and tab/bracket 610. A pneumatic or hydraulic cylinder (e.g., cylinder 616) is mounted (e.g., by a pivot bracket or other bracket) to an inner surface within lateral member 602.

In various embodiments, cylinder 616 (e.g., a pneumatic cylinder) and end rod 618 comprises a cushioned two-way pneumatic cylinder. Activation of the active panel (e.g., side member 606) is performed by activating the cylinder 616. The end rod 618 of the cylinder 616 is connected to the active side member 606. The active panel, which is rotatably connected to the lateral member via a pivot joint formed by inserting shoulder bolt 614 through hole(s) 612 and tab or bracket 610, is pushed/pulled by the pneumatic cylinder to close/open the active side member 606, respectively. The actuation of the cylinder 616 is controlled, in various embodiments, by a four-way two-position single solenoid.

In some embodiments, an end effector such as end effector 600 includes a limit switch mounted near the active side member 606, which is positioned to be triggered when the active side member is (fully) in the closed position, as shown in FIG. 6B.

Figure 6C:
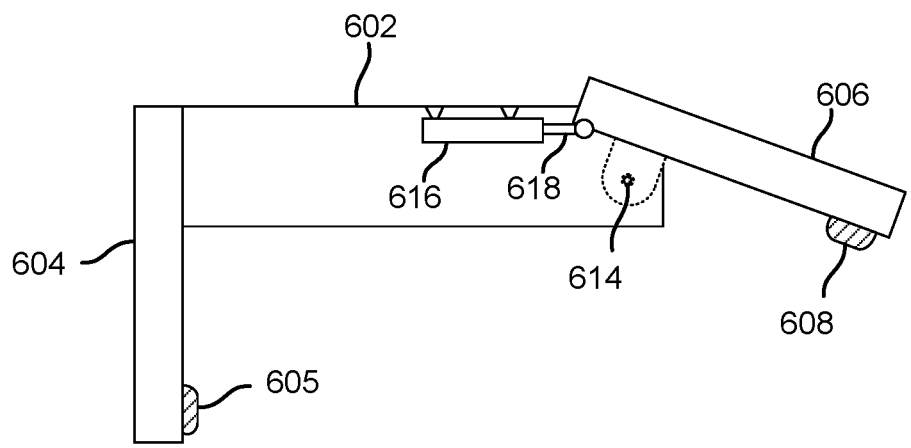
FIG. 6C is a diagram illustrating an embodiment of a robotically controlled tray handling end effector.

FIG. 6C is a diagram illustrating an embodiment of a robotically controlled tray handling end effector. In the example and state shown, the cylinder 616 has been activated to pull the end rod 618 in, resulting in the active side member 606 being pulled into the open position, as shown.

In various embodiments, the end effector 600 includes one or more infrared (IR) sensors, each comprising an active IR emitter mounted on the passive side member 604 and a corresponding reflector on the active side member 606. The IR sensor(s) is/are triggered, in some embodiments, when a tray comes into the reflective field of the sensor as the robot is trying to pick a tray. In some embodiments, two sensors are present in the passive side member 604: one sensor is located at the extremity of the fin, while the other is placed in the area where a tray would be when a tray is engaged by the gripper. A third sensor, in the thumb of active side member 606, is directed such that when the active side member 606 closes onto the tray, the tray's inner handle area gets in the view of the sensor thus triggering that the active side member 606 has successfully engaged in the tray.

In some embodiments, the lateral member 602 and side members 604, 606 are composed of carbon fiber. The lateral member 602 comprises a hollow square beam composed of a braided carbon fiber pole that allows for torsional stiffness. The side panels (e.g., side members 604, 606) are composed of ⅜" carbon fiber plates, machined to specification.

Figure 6D:
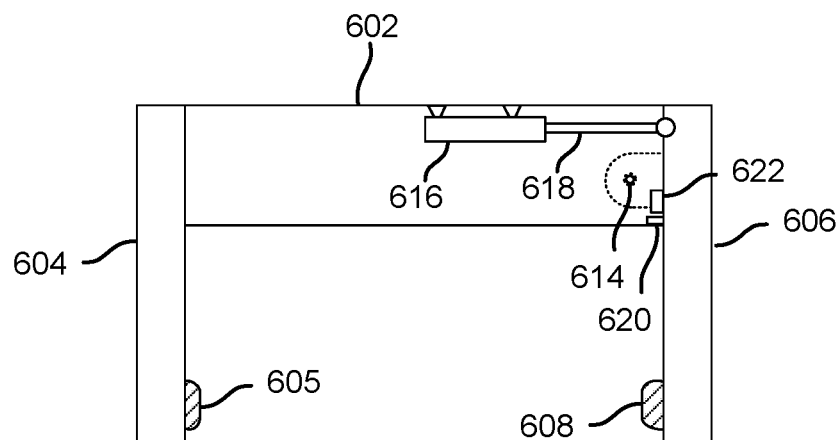
FIG. 6D is a diagram illustrating an embodiment of a robotically controlled tray handling end effector.
Figure 6E:
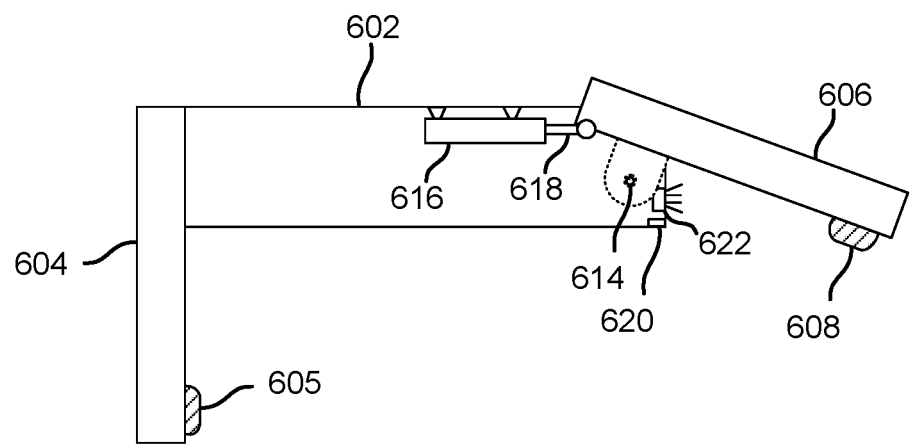
FIG. 6E is a diagram illustrating an embodiment of a robotically controlled tray handling end effector.

FIG. 6D is a diagram illustrating an embodiment of a robotically controlled tray handling end effector. FIG. 6E is a diagram illustrating an embodiment of a robotically controlled tray handling end effector. In the examples illustrated in FIGS. 6D and 6E, end effector 600 further comprises a stopping mechanism (e.g., a stopper) 620 and/or a sensor 622.

In some embodiments, the robotic system uses sensor 622 to detect whether the active arm is in an open position or a closed position. Sensor 622 may comprises a set of one or more sensors that are disposed in end effector such as at lateral member 602 and/or active side member 606. For example, the sensor is a mechanical limit switch that is configured to obtain information indicative of whether the active side member 606 is in an open position or a closed position. In some embodiments, sensor 622 is used to detect an extent to which the active side member 606 is in an open position or a closed position (e.g., the sensor determines a particular orientation of the active side member 606 or a particular location of the active side member 606 between the open position and the closed position, inclusive). For example, sensor 622 is a light sensor. The light sensor is configured to obtain information indicative of whether the active side member is in an open position or a closed position. The light sensor may be further configured to obtain information indicative of an extent to which the active side member is open (e.g., whether the active arm is partially open such as half-way between the open position and the closed position, etc.). The robotic system uses sensor 622 (e.g., the sensor(s) that obtains information pertaining to a position of the active arm) to control actuation of an actuator that moves the active side member 606 to move (e.g., to move the active arm between the closed position and open position).

In some embodiments, stopping mechanism 620 is used to restrict active member from moving past a closed position threshold when the actuator is actuated to move to an active member to the closed position. The stopping mechanism 620 is configured based on a desired closed position threshold. As an example, the closed position threshold can be about 90 degrees relative to a plane/vector along which lateral member 602 extends in a lengthwise direction, etc.

Figure 6F:
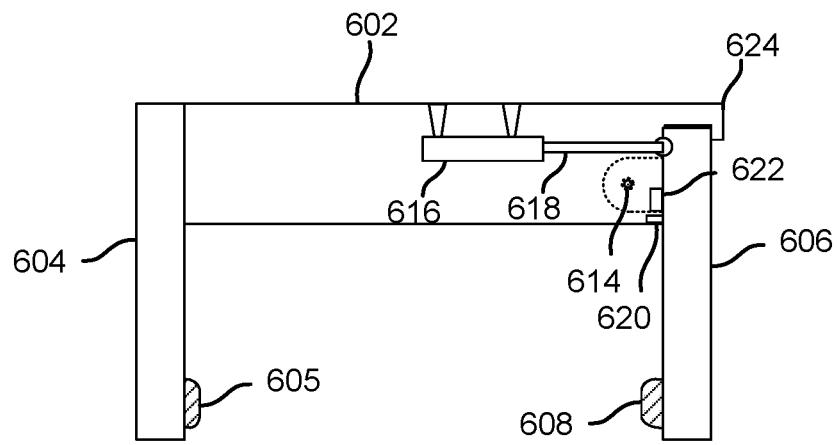
FIG. 6F is a diagram illustrating an embodiment of a robotically controlled tray handling end effector.
Figure 6G:
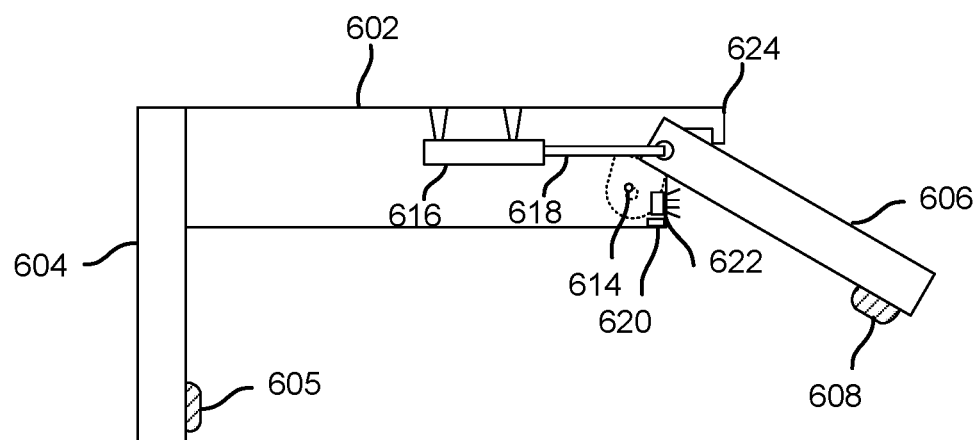
FIG. 6G is a diagram illustrating an embodiment of a robotically controlled tray handling end effector.

FIG. 6F is a diagram illustrating an embodiment of a robotically controlled tray handling end effector. FIG. 6G is a diagram illustrating an embodiment of a robotically controlled tray handling end effector. In the examples illustrated in FIGS. 6F and 6G, end effector 600 further comprises a stopping mechanism 620 or 624 (e.g., a stopper), and/or a sensor 622.

In some embodiments, stopping mechanism 624 is used to restrict active member from opening past an open position threshold when the actuator is actuated to move to an active member to the open position. The stopping mechanism 624 is configured based on a desired open position threshold. As an example, the open position threshold can be about 130 degrees relative to a plane/vector along which lateral member 602 extends in a lengthwise direction, etc. Stopping mechanism can be coupled (e.g., bolted, etc.) to lateral member 602 or otherwise integrated with lateral member 602.

Figure 7A:
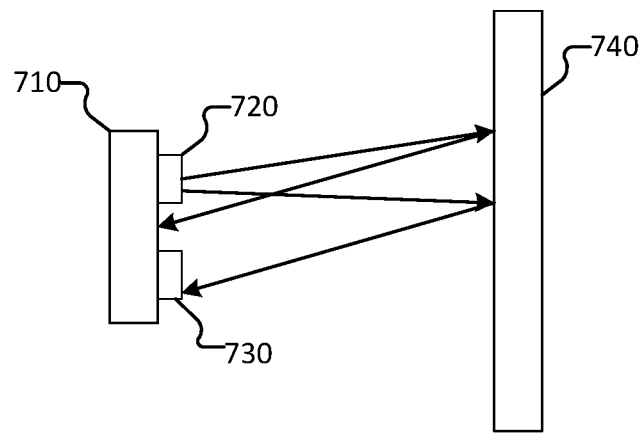
FIG. 7A is a diagram illustrating an embodiment of a sensor for a robotically controlled tray handling end effector.

FIG. 7A is a diagram illustrating an embodiment of a sensor for a robotically controlled tray handling end effector. In the example illustrated, sensor system 700 comprises a sensor 710 that includes an emitter 720 and a receiver 730. Sensor system 700 may be an optical sensor that emits rays from emitter 720 (e.g., infrared rays, light rays, etc.) and that receives rays reflecting from a surface such as a tray 740 to be grasped by the end effector. In some embodiments, sensor system 700 is implemented as sensor 315 and/or sensor 315b of end effector 300 of FIG. 3C.

Figure 7B:
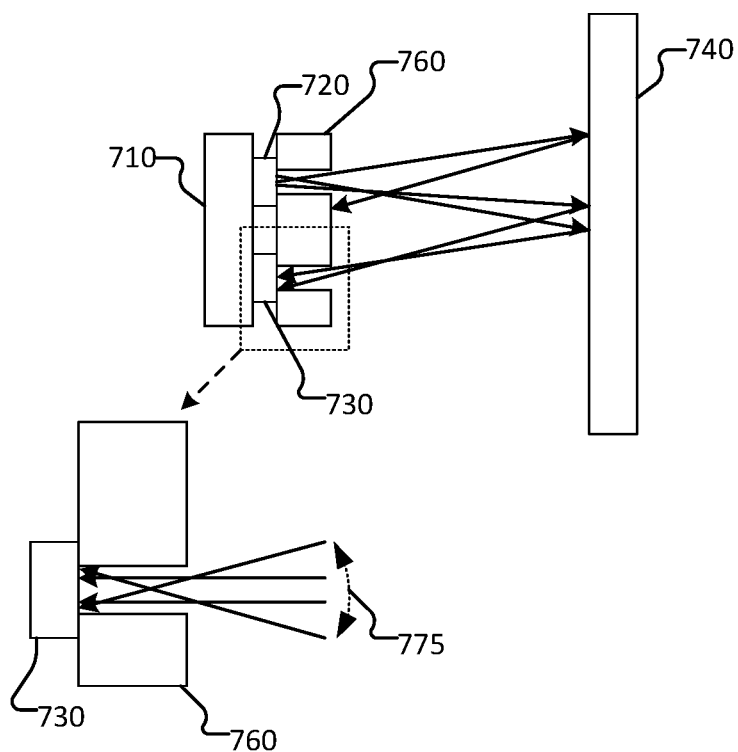
FIG. 7B is a diagram illustrating an embodiment of a sensor for a robotically controlled tray handling end effector.

FIG. 7B is a diagram illustrating an embodiment of a sensor for a robotically controlled tray handling end effector. In the example illustrated, sensor system 750 comprises a sensor 710 that includes an emitter 720 and a receiver 730. Sensor 710 further includes a cover 760 that reduces the incident light on receiver 730. For example, the range 715 of incident light on receiver 730 is smaller than the range of incident light on a receiver 730 of sensor system 700. As an example, cover 760 can restrict the effective range of degrees by which light can reflect from tray 740 and still be received by emitter 720 (e.g., the angles of incident light are closer to normal for receiver 730 of the sensor system). Sensor system 750 can be used to more precisely detect whether the end effector is in position to grasp the tray 740. In some embodiments, sensor system 750 is implemented as sensor 315 and/or sensor 315b of end effector 300 of FIG. 3C.

Figure 8A:
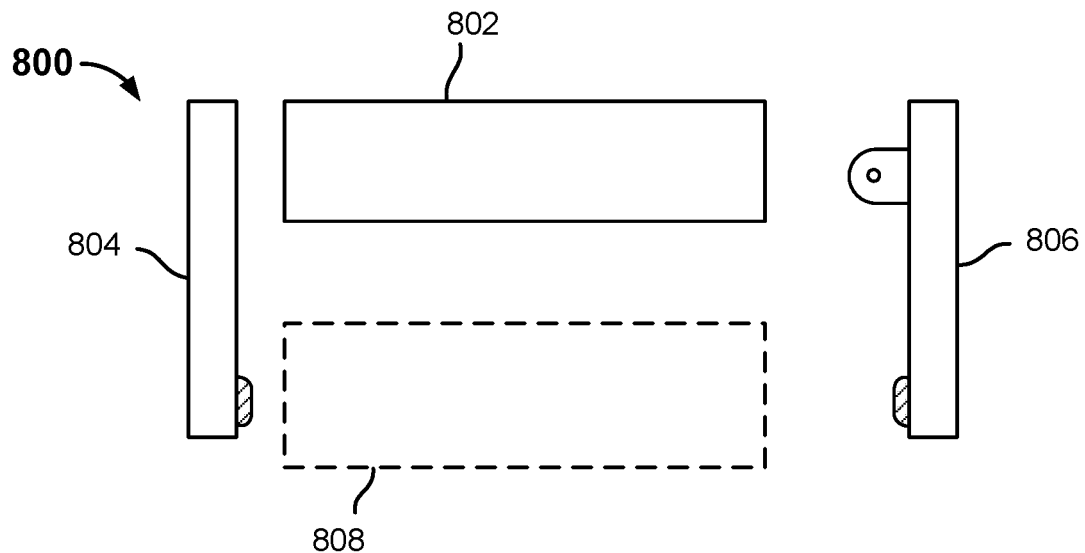
FIG. 8A is a diagram illustrating an embodiment of a robotically controlled tray handling end effector.

FIG. 8A is a diagram illustrating an embodiment of a robotically controlled tray handling end effector. In the example shown, tray handling end effector 800 includes a lateral member 802 and detachable and/or modular passive and active side members 804 and 806, respectively. As shown, the end effector 800 accommodates and is capable of being used to grasp only a single tray.

Figure 8B:
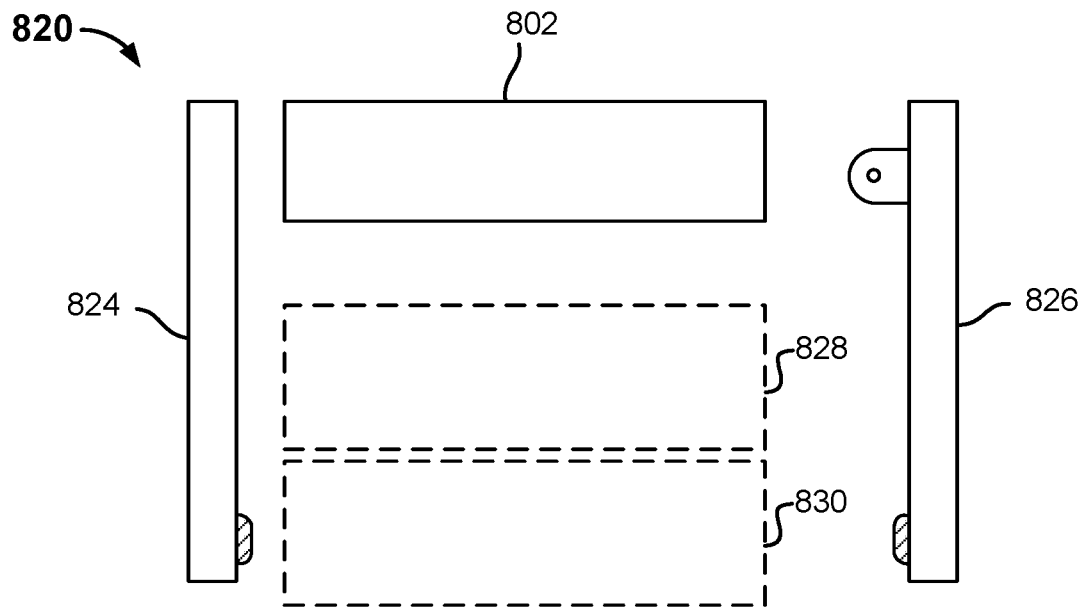
FIG. 8B is a diagram illustrating an embodiment of a robotically controlled tray handling end effector.

FIG. 8B is a diagram illustrating an embodiment of a robotically controlled tray handling end effector. In the example shown, the end effector 820 has been provided by detaching and removing the side members 807, 806 from lateral member 802 of end effector 800, and installing elongated side members 824 and 826. In the configuration shown in FIG. 7B, end effector 820 may be used to pick up at two tray high stack of trays—e.g., trays 828 and 830 in the example shown in FIG. 8B—for example, by inserting the respective thumbs of the side members 824, 826 into holes on opposite sides of the bottommost tray (i.e., tray 830 in the example shown).

Figure 9A:
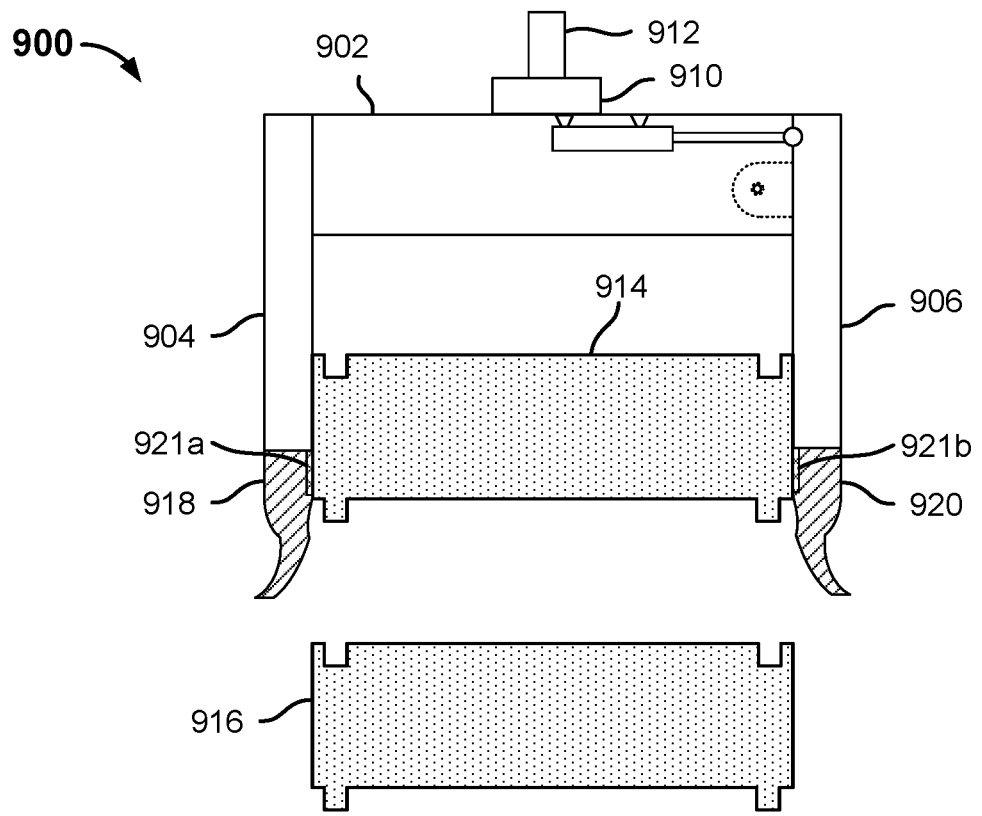
FIG. 9A is a diagram illustrating an embodiment of a robotically controlled tray handling end effector equipped with a guide fin.

FIG. 9A is a diagram illustrating an embodiment of a robotically controlled tray handling end effector equipped with a guide fin. In the example shown, tray handling end effector 900 includes a lateral member 902, passive side member 904, and active side member 906. End effector 900 is attached to a robotic arm (not shown) via a force sensor 910 and pivot bracket 912. In the state shown, end effector has in its grasp a tray 914. For example, passive and active side thumbs (not shown) of passive side 904 and active side member 906, respectively, may be inserted into corresponding holes (not shown) on either side of tray 914.

In the example shown, end effector 900 further includes guide fins 918 and 920, mounted along the bottom edges of passive side member 904 and active side member 906, respectively. In various embodiments, the guide fins 918, 920 extend along all or a substantial portion of the bottom edge of the side members 904, 906. As shown, each guide fin 918, 920 has a shape that flares outward at the bottom, such that the distance between the respective bottom edges of the guide fins 918, 920 is greater than the width of the tray 914 and the distance between the inner faces of the passive and active side members 904, 906 when in the closed position, as shown.

As shown in FIG. 9A, the end effector 900 is being used to position the tray 914 over tray 916, e.g., to place the tray 914 onto the tray 916. For example, the tray 916 may be the topmost tray on a destinate stack to which the tray 914 is to be added.

In some embodiments, end effector comprises one or more vehicle gripper modules 921a or 921b on passive and active side members 904, 906, or guide fins 918, 920. The vehicle gripper modules 921a or 921b can comprise inner surfaces (e.g., surfaces that engage a tray or vehicle such as a dolly) that have a relatively higher friction than inner surfaces of passive and active side members 904, 906, or guide fins 918, 920. The one or more vehicle gripper modules 921a or 921b can be shaped or configured to stably grasp a vehicle (e.g., dolly) when the end effector is controlled to engage the one or more vehicle gripper modules 921a or 921b with such a vehicle.

Figure 9B:
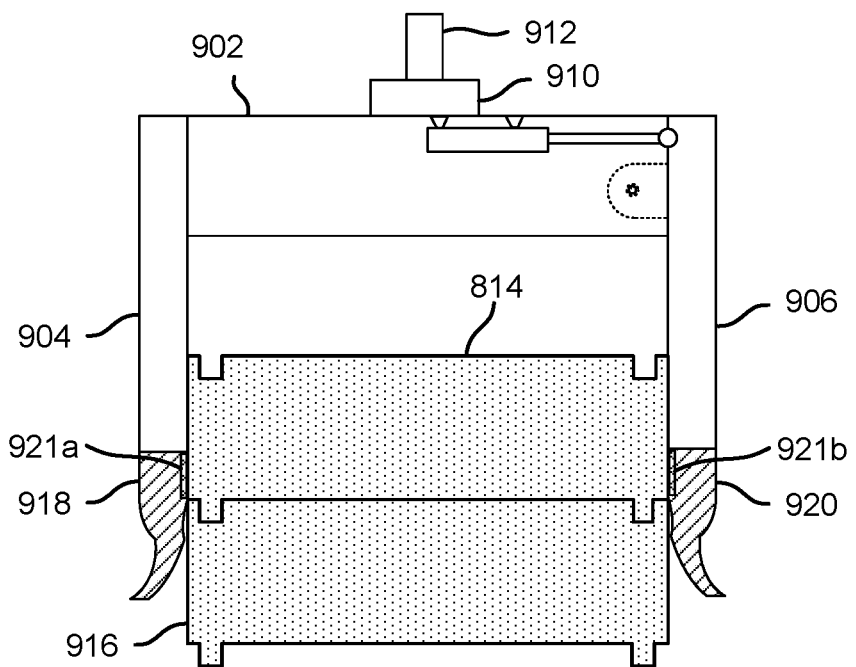
FIG. 9B is a diagram illustrating an embodiment of a robotically controlled tray handling end effector equipped with a guide fin.

FIG. 9B is a diagram illustrating an embodiment of a robotically controlled tray handling end effector equipped with a guide fin. In the example and state shown in FIG. 9B, the guide fins 918, 920 have facilitated the use of force control to align and place the tray 914 onto tray 916, as shown. In various embodiments, the guide fins 918, 920 have a certain degree of compliance that facilitates the placing of trays. The guide fins are designed in various embodiments to have flexure properties to increase operation speed and tolerances as well as accuracy.

In various embodiments, tray place episodes by a single robot tray gripping robot as disclosed herein are smooth, gentle, and precise and tolerant to uncertainty and wobbling. In various embodiments, a place episode includes one or more of:

- Using force control to go down from a hover position above the destination stack (e.g., as shown in FIG. 9A) and making contact with the guide fins (e.g., one or both of guide fins 918, 920) first.
- The guide fins 918, 920 help to guide the tray being placed into a position more aligned with the tray on which the tray being placed is to be place, and the guide fins 918, 920 also provide feedback signals via the load cell (e.g., force sensor 910) to adjust the position of the incoming tray on top of the stack.
- Using force control, the robot makes steady contact with the destination stack and gently inserts the tray (e.g., 914) onto it.

Figure 9C:
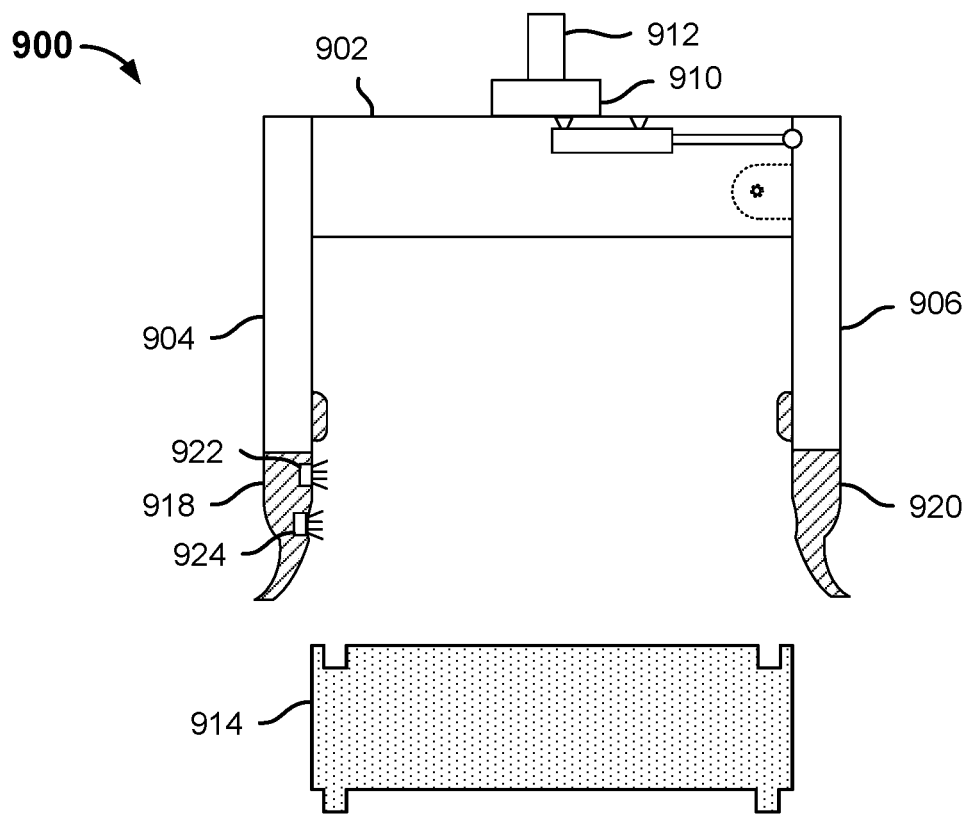
FIG. 9C is a diagram illustrating an embodiment of a robotically controlled tray handling end effector equipped with a guide fin.
Figure 9D:
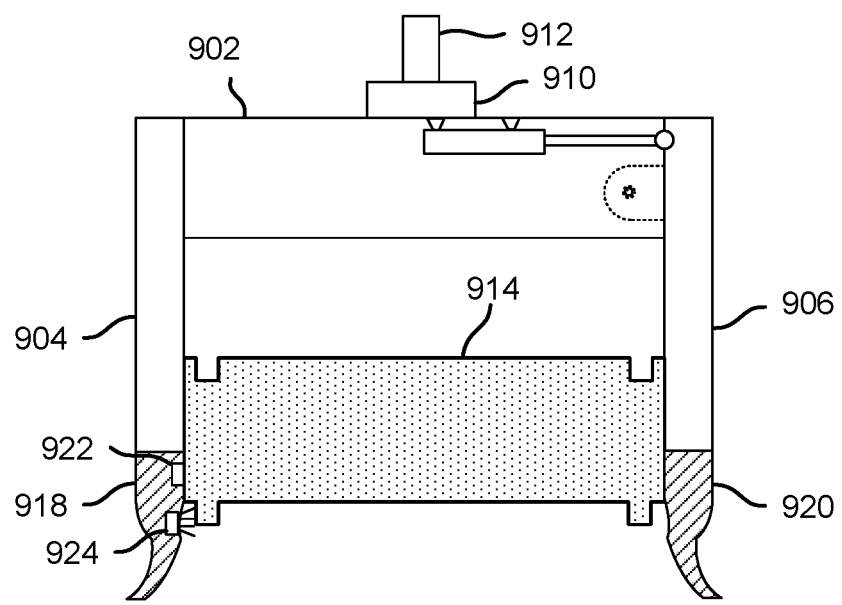
FIG. 9D is a diagram illustrating an embodiment of a robotically controlled tray handling end effector equipped with a guide fin.

FIG. 9C is a diagram illustrating an embodiment of a robotically controlled tray handling end effector equipped with a guide fin. FIG. 9D is a diagram illustrating an embodiment of a robotically controlled tray handling end effector equipped with a guide fin. In the examples illustrated in FIGS. 9C and 9D, end effector 900 further comprises sensor(s) 922 and/or sensor(s) 924. The robotic system uses sensor(s) 922 and/or sensor(s) 924 in connection with guiding end effector 900 to grasp tray 914, such as to control end effector 900 to engage tray 914 with a structure on the passive side member 90004 (e.g., a thumb on the passive side member 904).

The robotic system uses sensor(s) 924 to detect whether tray 914 is in proximity to end effector 900 such as in a manner that robotic system can finely control movement of end effector to engage the tray with the structure on the passive side member 904 (e.g., a thumb on the passive side member 904). In some embodiments, sensor(s) 924 indicative of when tray 914 is in a position at which end effector 900 is controlled to engage the passive-side structure with the hole, the recess, or the handle comprised in the tray 814.

The robotic system uses sensor(s) 922 to detect whether tray 914 is engaged by passive member (e.g., by the structure on the passive side member 904, such as a thumb). In some embodiments, sensor(s) 924 indicative of when tray 914 is in a position at which the passive-side structure is engaged with the hole, the recess, or the handle comprised in the tray 914. As illustrated in FIG. 9D, the system determines that the robotic system determines that the tray 914 is in a position at which the passive-side structure is engaged with the hole, the recess, or the handle comprised in the tray 914 when (i) information obtained from sensor(s) indicates that a structure is adjacent the sensor (e.g., light is reflected back to sensor(s) 922), (ii) information obtained by sensor(s) 924 indicates that no structure is proximate to sensor(s) 922 (e.g., no light is reflected back to sensor(s) 924).

In some embodiments, the robotic system uses information obtained by sensor(s) 922 and/or 924 in connection with determining whether to control the actuator to move the active side member 906 (e.g., to engage tray 914 with a thumb of active side member 906) to grasp tray 914.

Figure 10:
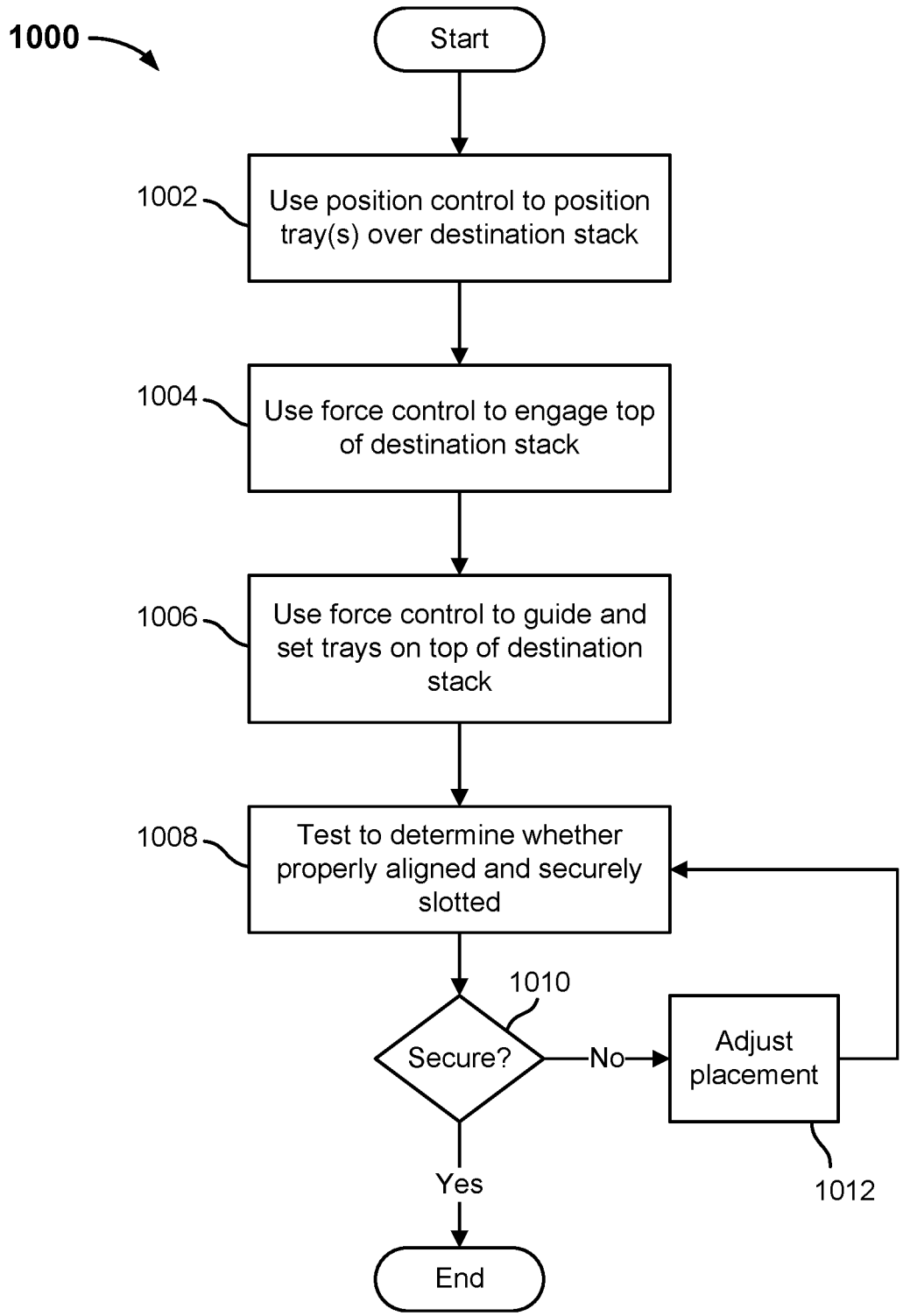
FIG. 10 is a flow diagram illustrating an embodiment of an automated process to place one or more trays on a stack.

FIG. 10 is a flow diagram illustrating an embodiment of an automated process to place one or more trays on a stack. In various embodiments, the process 1000 of FIG. 10 is performed by a control computer, such as control computer 128 of FIG. 1A, configured to control one or more single robot tray handling robots, as disclosed herein. In the example shown, at 1002 position control is used to position one or more trays to be placed, e.g., on the top of a destination stack. For example, 3D camera and/or other image data may be used to determine a position and orientation of the destination stack, and the robot may be moved (e.g., along a rail) into a position near the destination stack and then the robotic arm maneuvered to position the tray above the destination stack. At 1004, force control is used to engage the top of the destination stack. For example, referring to the example shown in FIGS. 9A and 9B, the tray 914 may be lowered until the bottom edge of one or both of the guide fins 918, 920 just touches the tray 916 at the top of the destination stack. At 1006, force control is used to guide and set the tray (e.g., tray 914) onto the top of the destination stack (e.g., top of tray 916). At 1008, the robot tests to determine whether the tray being placed is fully and properly aligned with and securely slotted into the top of the topmost tray of the destination stack.

In various embodiments, the slotting episode (e.g., 1008) serves to ensure the stability of the tray on top of the stack and its proper insertion. After the adjustment in the z axis (up/down) and the y axis (axis along rail along with the trays slot, e.g., the axis into and out of the page as shown in FIGS. 9A and 9B) the robot executes a routing to ensure that the third direction (x axis, side to side as shown in FIGS. 9A and 9B) is also stable. In various embodiments, a slotting episode includes:

- Gently pull the tray back on top of the slot as it was placed in an offset position forward with respect to the stack.
- Series of force motions to get the tray unstuck and moving smoothly; if force feedback indicates the tray is over-slotted, corrective action is performed to reverse the slot. For example, if the system fails to find a notch at the back of the tray and there is an equivalent notch at the front of the tray, the system tries to "slot" against it by reversing the direction of slotting motion.
- The quality of the slot is verified by moving the tray forward and backward and analyzing the resulting force signals. In various embodiments, the robot learns and/or is manually trained to recognize force signals indicative of secure (or not secure) slotting.

If the tray is determined to have been securely slotted (1010), the robot releases the tray (e.g., opens the active side and withdraws the passive side thumb from the hole into which it was inserted) and the process ends. If not (1010), at 1012 the placement is adjusted and tested again at 1008. If after a configured number of attempts the tray cannot be verified as having been placed securely, in various embodiments, the system prompts a human worker to assist it, e.g., by teleoperation or manual work.

Figure 11:
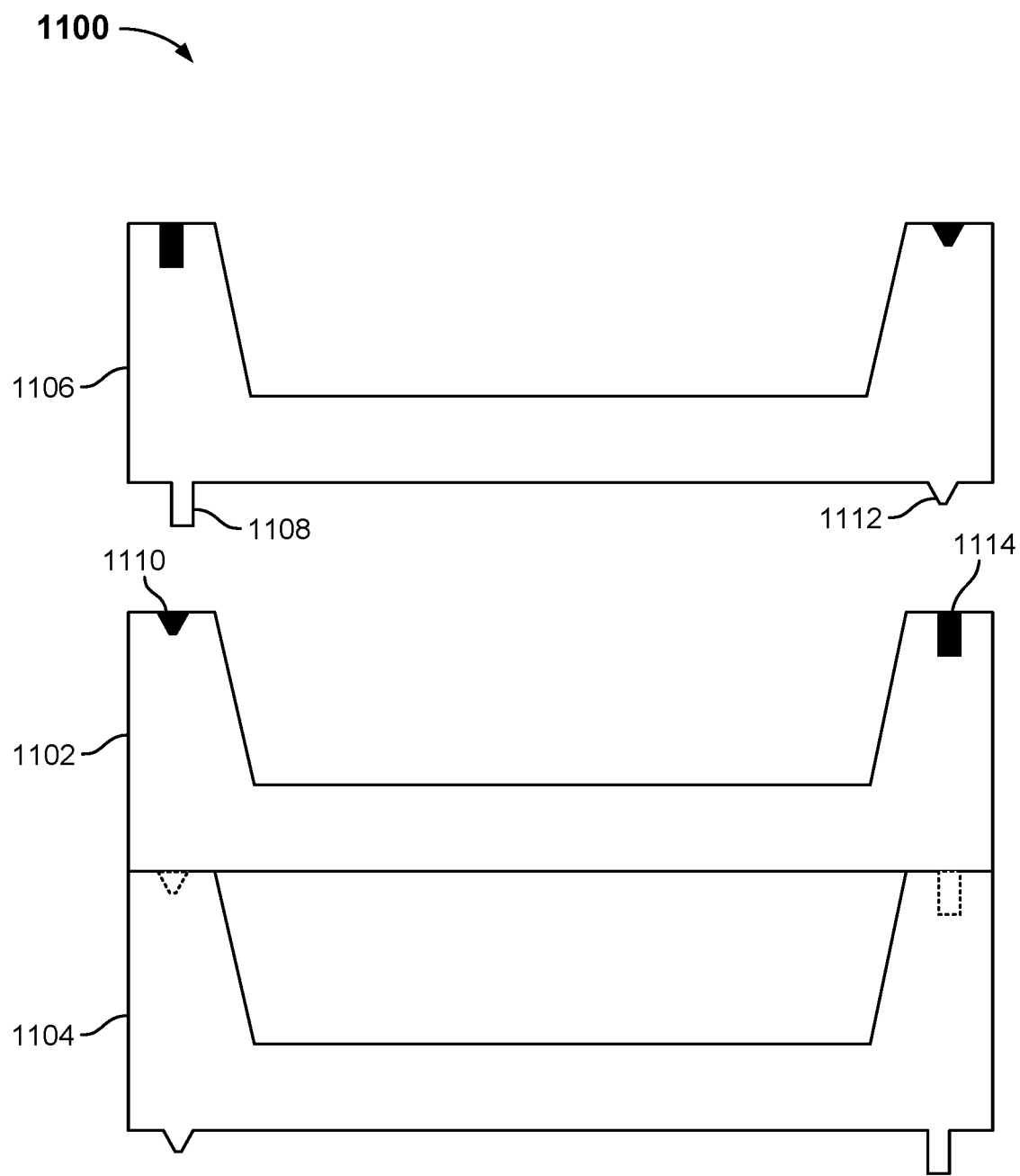
FIG. 11 is a diagram illustrating an example of a stack of trays configured to be stacked in a specific tray orientation.

FIG. 11 is a diagram illustrating an example of a stack of trays configured to be stacked in a specific tray orientation. In the example shown, destination stack 1100 includes a tray 1102 stacked on top of a tray 1104. A tray 1106 is to be added to the top of the stack 1100. The trays 1102, 1104, 1106 each include a pair of dissimilarly shaped recesses at the top of the tray, e.g., recesses 1110 and 1114 on the top of tray 1102, one a on first side and the other on the opposite side, and corresponding protrusions at the bottom of the tray, e.g., protrusions 1108 and 1112 at the bottom of tray 1106. As shown in FIG. 11, the protrusion 1108 is of a size and shape to fit into recess 1114, while protrusion 1112 is of a size and shape to fit into recess 1110. However, as shown tray 1106 is flipped around such that the protrusion 1108 is over recess 1110, which it does not match, while protrusion 1112 is positioned over recess 1114, which it also does not match.

In various embodiments, a tray handling robot system as disclosed herein learns and/or is trained to recognize a force sensor reading and/or profile associated with a misalignment as shown in FIG. 11. The system may detect, e.g., upon attempting to place the tray 1106 onto tray 1102, that the tray 1106 is not slotted securely onto tray 1102 in a way associated with the tray 1106 being flipped around into a reverse position, as shown in FIG. 11. In various embodiments, in response to detecting an incorrect orientation as shown in FIG. 11, the system lifts the tray (e.g., 1106) up, rotates the tray 180 degrees around the z (up/down) axis, and renews its attempt to place the tray on top of the destination stack.

Figure 12:
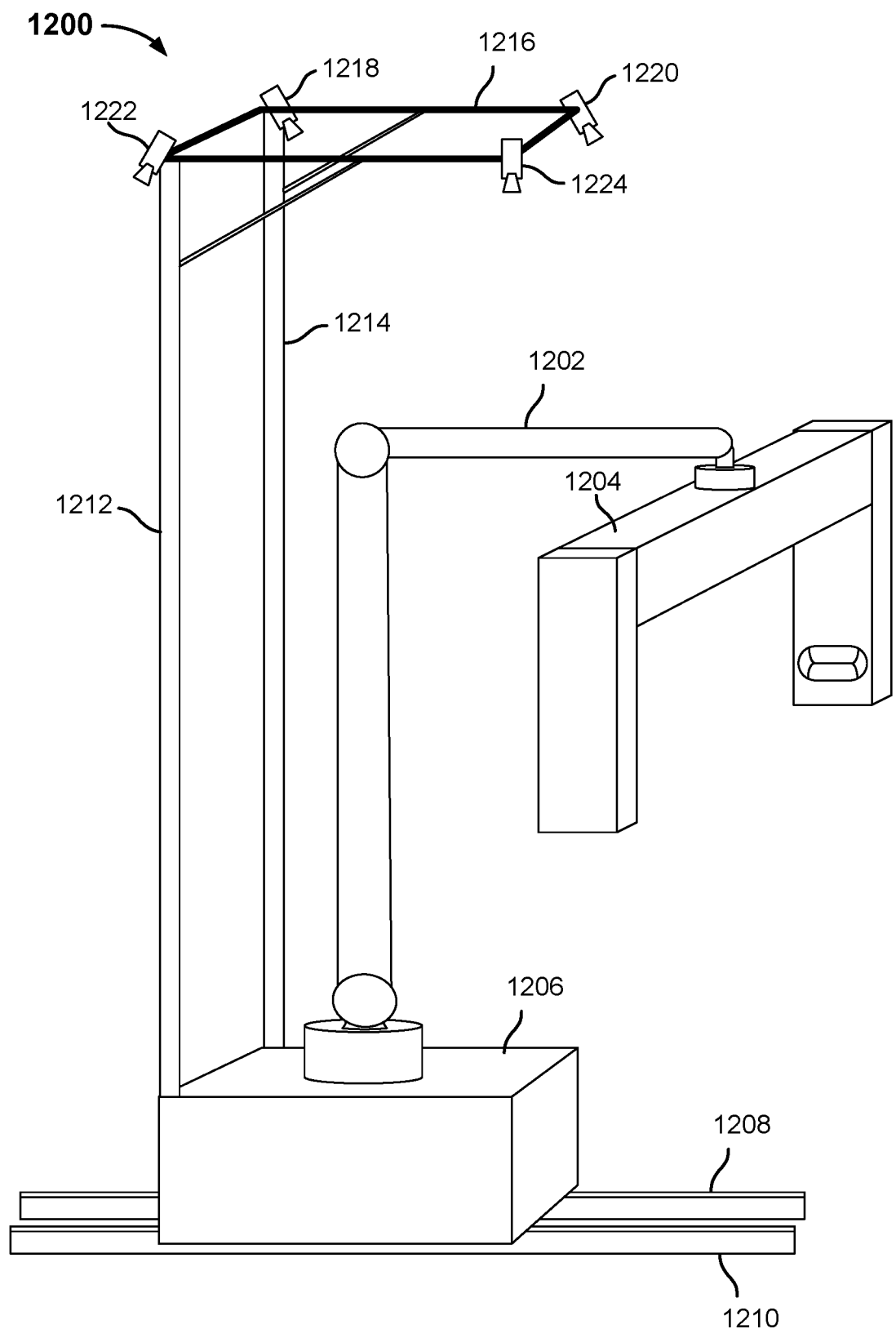
FIG. 12 is a diagram illustrating an embodiment of a tray handling robot.

FIG. 12 is a diagram illustrating an embodiment of a tray handling robot. In various embodiments, one or more robots such as robot 1200 of FIG. 12 may be included in a robotic tray handling system as disclosed herein, e.g., robotic arms 112, 114 in FIGS. 1A and 1B. In the example shown, robot 1200 includes a robotic arm 1202 and tray handling end effector mounted on a chassis 1206 (e.g., a carriage, etc.) configured to be moved under robotic control along rails 1208 and 1210. A superstructure comprising vertical supports 1212 and 1214 and upper frame 1216 provides mounting locations for 3D cameras 1218, 1220, 1222, and 1224. In various embodiments, one or more 3D cameras may be placed near the base of the robot.

In various embodiments, robot 1200 is deployed in a tray handling system as shown in FIGS. 1A and 1B. Source tray stacks may be provided on one side of rails 1208 and 1210 (e.g., beyond rail 1208 as shown) and destination tray stacks may be built on an opposite side of rails 1208 and 1210 (e.g., on the side of rail 1210 nearer the viewer, as shown). Pairs of cameras on the source tray stack side (e.g., 1218, 1220) and destination tray stack side (e.g., 1222, 1224) are used to provide a view of relevant portions of the workspace in the vicinity in which the robot 1200 is located and working.

In various embodiments, the image data may be used to do one or more of the following: avoid collisions with other robots, tray stacks, and other items present in the workspace; plan trajectories; and position the end effector 1204 and/or a tray in the grasp of end effector 1204 in at least an initial position under position control.

In some embodiments, the cameras 1218, 1220, 1222, and 1224 are included in a vision system used to control of a robotic tray handling system as disclosed herein. In some embodiments, the vision system is designed to self-calibrate. The robot uses a marker that is installed on one of its joints and exposes the marker to the cameras in the system, e.g., cameras 1218, 1220, 1222, and 1224, which recognize the marker and perform a pose estimation to understand their own pose in world coordinates. The robot plans its motion using collision avoidance to get the marker into a position close to the cameras to get a high-quality calibration.

In some embodiments, a onetime manual process follows the automatic calibration to further ensure the quality of the process. A point cloud is overlaid on top of the simulated graphics of the system and a human operator performs the matching or the rendered graphics of the robot plus environment in a simulator to the point cloud as seen by the camera mounted on the robot. Further verification procedures are also in place to verify perceived depth of objects of known heights in the world frame (coordinates).

In some embodiments, a system as disclosed herein self-calibrates its own dimensions. The robot moves up and down the rail to find the pick and place locations and uses force control to find the coordinates of the input-output slots. It dynamically performs an update. For example, in some embodiments, the system uses specially designed calibration motions (including force control) to find the exact locations of each of the input and the output facings (where stacks of trays exist) referred to as the "layout", and updates layout values internally that many times reveal variations such as uneven ground surfaces, peripheral installation misalignments. The robot dynamically performs these updates through its lifespan, in various embodiments.

In some embodiments, the vision system approximates the pose of the target tray or the target destination stack to check the robot goal motions. A vision system scheduler guarantees simultaneous checks when it is possible to and both input and output targets are in the field of view.

Figure 13:
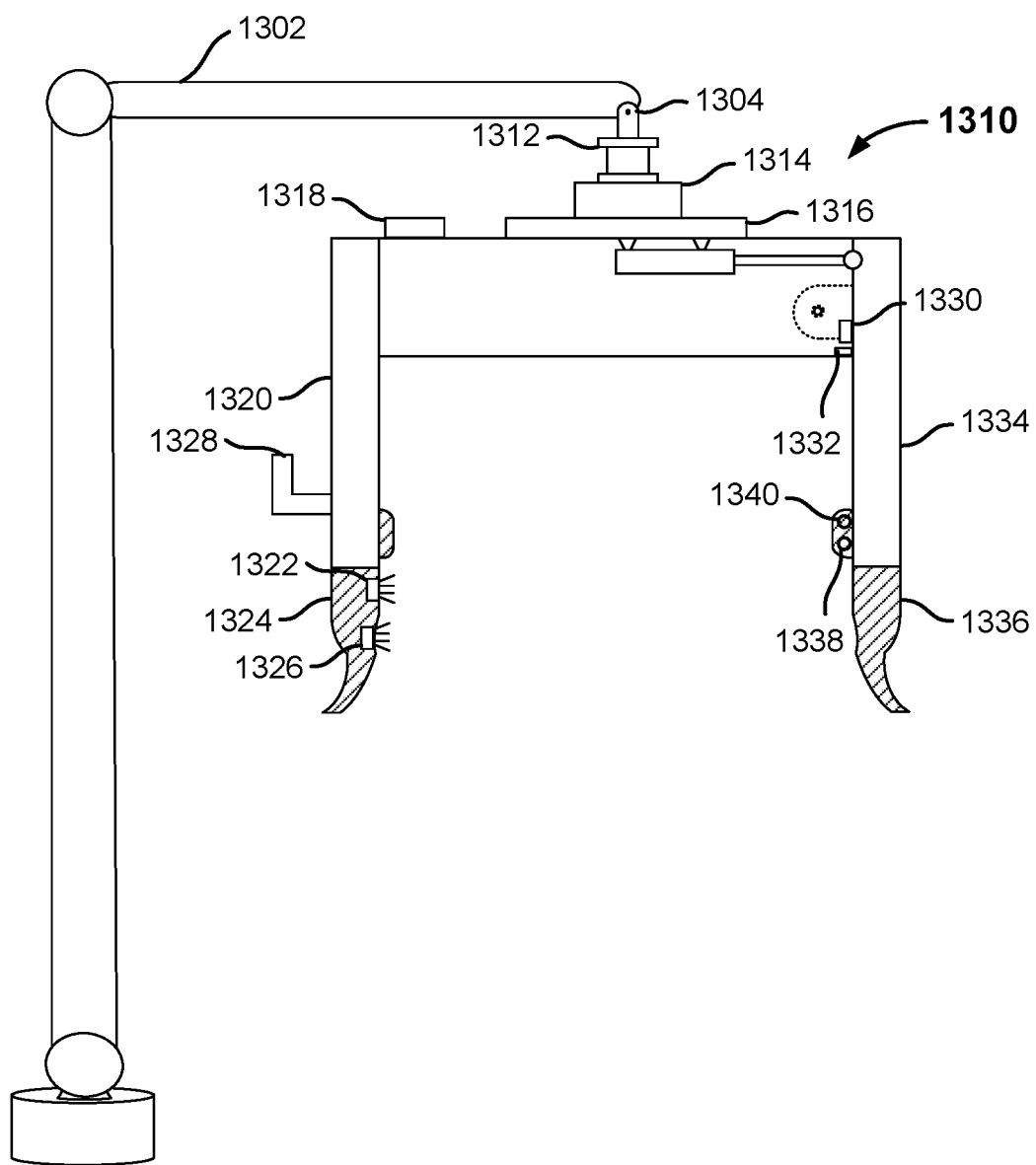
FIG. 13 is a diagram illustrating an embodiment of a tray handling robot.

FIG. 13 is a diagram illustrating an embodiment of a tray handling robot. In the example illustrated in FIG. 13, robot 1300 can be mounted on a chassis such as 1206 of FIG. 12, and robot 1300 can be configured to be moved under robotic control along rails such as rails 1308 and 1310 of FIG. 12.

As shown in FIG. 13, robot 1300 includes a robot arm 1302 to which end effector 1310 is connected. End effector 1310 comprises a passive side member 1320 and an active side member 1334, which may be connected via a lateral member. Each of passive side member 1320 and an active side member 1334 may include one or more structures, such as thumbs, with which to engage and grasp a tray. Passive side member 1320 and active side member 1334 respectively include guide fins 1323 and 1336 that flare outwards that guides a tray to a position between passive side member 1320 and active side member 1334 (e.g., to a position at which thumbs on the passive side member 1320 and active side member 1334 engage the tray). End effector 1310 further comprises a plurality of sensors, including sensor(s) 1330, sensors 1238 and 1240, and sensors 1322 and 1326. As an example, sensor(s) 1330 may correspond to, or be similar to, sensor 622 of FIGS. 6D and 6E. Sensor 1330 is disposed on the lateral member of end effector 1310 or otherwise in a position on end effector from which a position of active side member 1334 can be detected. As another example, sensors 1338 and 1340 may correspond to, or be similar to, sensors 315a and 315b of FIG. 3C. Sensors 1338 and 1340 are disposed on or around the thumb on the active side member 1334. As another example, sensors 1322 and 1326 may correspond to, or be similar to, sensor 822 and 824 of FIG. 8C. Sensors 1322 and 1326 are disposed on or around guide fin 1324 on passive side member 1320.

In various embodiments, end effector 1310 comprises a wire harness 1318 with which connections between a control computer of robotic system, such as control computer 128 of FIG. 1A, and the plurality of sensors comprised in end effector. Wire harness 1318 can provide a single pathway via which the plurality of sensors are connected to the control computer (e.g., via a network connection). An output pathway (e.g., cable) connects wire harness 1318 to the control computer. The output cable of wire harness 1318 can be an M12 connector such as M12-12 position sensor cable. For example, each of the plurality of sensors are connected to a set of one or more input terminals of wire harness 1318. In addition, one or more other components/modules of end effector 1310 are connected to the control computer via wire harness 1318. For example, an actuator used to cause active member side 1334 is connected to an input terminal of wire harness 1318. Wire harness 1318 is thereafter connected to control computer such as via a wire/channel that is connected to, or comprised in, robot arm 1302.

In various embodiments, end effector 1310 comprises force sensor 1314 that obtains information pertaining to forces/moments experienced by end effector 1310 such as by passive side member 1320 and/or active side member 1334. Force sensor 1314 is connected to end effector by mounting plate 1316, and the end effector 1310 and force sensor 1314 are connected to a distal end 1304 of robot arm 1302 by adapter 1312.

In various embodiments, end effector 1310 comprises a cart picking module 133328. Cart picking module 1328 is configured to pick up (e.g., grasp) a cart such as to enable robot arm 1302 to move a cart from which a stack of trays are grasped, picked, and placed to destination locations. For example, after the cart has been emptied of the stack of trays, the cart is moved to a predetermined return area (e.g., a location at which empty carts are stored and recycled for further trays). Cart picking module 1328 can be disposed on passive side member 1320. The robotic system determines when a cart is empty, and then controls the robot arm 1302 to use end effector 1310 to pick up the cart. Thereafter, the control system controls to move the robot arm 1302 to place the empty cart in the predetermined return area.

In various embodiments, a single robot tray handling robotic system as disclosed herein enables destination (output) stacks to be assembled reliably, quickly, and efficiently by picking trays from source stacks and building destination (output) stacks according to a plan, e.g., based on order, invoice, manifest, or similar information.

Although the foregoing embodiments have been described in connection with the grasping, moving, and placing one or more trays, various other receptacles or containers may be implemented. Examples of other receptacles or containers include bags, boxes, pallets, crates, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An end effector, comprising:
   a lateral member configured to be coupled to a robotic arm;
   a passive side member coupled substantially rigidly to the lateral member at a first distal end and configured to engage mechanically with a first recess on a first side of an object to be grasped;
   an active side member coupled to the lateral member at a second distal end opposite the first distal end and configured to engage mechanically with a second recess on a second side of the object to be grasped, the second side being opposite the first side of the object to be grasped;

wherein:
   the passive side member comprises a passive-side structure that is configured to be inserted into the first recess on the first side of the object to be grasped;
   the active side member comprises an active-side structure that is configured to be inserted into the second recess on the second side of the object to be grasped; and
   a first profile of the passive-side structure is different from a second profile of the active-side structure, wherein the second profile of the active-side structure has a steeper curvature than the first profile of the passive-side structure; and
   an optical sensor located at the second distal end of the lateral member that is opposite the first distal end, wherein the optical sensor is configured to signal whether the active side member is in an open position or a closed position.

2. The end effector of claim 1, wherein the second profile of the active-side structure is longer than the first profile of the passive-side structure.

3. The end effector of claim 1, wherein the second profile of the active-side structure is at least 30% longer than the first profile of the passive-side structure.

4. The end effector of claim 1, wherein the active side member comprises one or more sensors that are used to detect whether the active-side structure is engaged with a hole, a recess, or a handle comprised in the object.

5. The end effector of claim 1, wherein:
   the passive side member is fixed relative to the lateral member;
   the active side member is movable with respect to the lateral member;
   the active side member is configured to move between the open position and the closed position via robotic control; and
   the open position is between 30 and 50 degrees from a normal vector relative to the lateral member.

6. The end effector of claim 5, wherein a processor in communication with the end effector is configured to operate the end effector in connection with an operation to pick one or more objects from a source stack, including by sending to the end effector a signal to place the active side member in the open position.

7. The end effector of claim 5, wherein the end effector further comprises the optical sensor that is configured to obtain information pertaining to a position of the active side member.

8. The end effector of claim 7, further comprising a mechanical limit switch that is configured to obtain information indicative of whether the active side member is in the open position or the closed position.

9. The end effector of claim 7, wherein the optical sensor is a light sensor that is configured to obtain information indicative of whether the active side member is in the open position or the closed position.

10. The end effector of claim 9, wherein the light sensor is further configured to obtain information indicative of an extent to which the active side member is open.

11. The end effector of claim 1, wherein:
    the passive-side structure comprises a first protrusion that is comprised in, or attached to, the passive side member; and
    the active-side structure comprises a second protrusion that is comprised in, or attached to, the active side member.

12. The end effector of claim 11, wherein the end effector is controlled to pick a tray at least in part by using position control based on image data to move at least the passive side member of the end effector into a position adjacent to a first structure and to use force control to insert into the first structure the first protrusion.

13. The end effector of claim 11, wherein:
the first protrusion comprises a first thumb structure configured to be inserted into a first structure;
the second protrusion comprises a second thumb structure configured to be inserted into the first structure; and
a size and/or shape of the first thumb structure and the second thumb structure are different.

14. The end effector of claim 1, wherein the active side member comprises:
a guide structure comprising a profile that guides a first object of one or more objects to be grasped to a position at which the active-side structure engages a hole, a recess, or a handle comprised in the first object.

15. The end effector of claim 1, wherein:
the passive side member comprises a guide structure comprising a profile that guides a first object of the one or more objects to be grasped to a position at which the passive-side structure engages a hole, a recess, or a handle comprised in the first object; and
the guide structure further comprises one or more sensors configured to obtain information indicating a position of the passive side member relative to the first object.

16. The end effector of claim 15, wherein the one or more sensors comprise:
a first sensor that obtains first information indicative of when the first object is in a position at which the end effector is controlled to engage the passive-side structure with the hole, the recess, or the handle comprised in the first object; and
a second sensor that obtains second information indicative of when the first object is in the position at which the passive-side structure is engaged with the hole, the recess, or the handle comprised in the first object.

17. The end effector of claim 1, wherein:
the active side member is movable with respect to the lateral member;
the active side member is configured to move between the open position and the closed position via robotic control; and
the end effector comprises a stopper that prevents the active side member from moving past the closed position at which the active side member is positioned 90 degrees relative to the lateral member.

18. An autonomous tray handling robotic system comprising the end effector of claim 1, wherein the system further comprises:
a memory configured to store data indicating a set of output stacks to be assembled, each output stack including an associated set of objects; and
a processor coupled to the memory and configured to control operation of one or more robots, each configured to grasp, move, and place one or more objects at a time, according to a plan, to iteratively pick objects from source stacks of objects and assemble the set of output stacks, including by building each output stack by successively placing on the output stack objects picked from one or more corresponding source stacks;
wherein:
each of the robots comprises the robotic arm and the end effector configured to grasp, move, and place one or more objects without assistance from another robot.

19. The end effector of claim 1, wherein:
the passive-side structure is configured to be inserted into the first recess in a direction that is substantially perpendicular to a first surface of the first side of the object; and
the active-side structure is configured to be inserted into the second recess in a direction that is substantially perpendicular to a second surface of the second side of the object.

* * * * *